US012194922B2

(12) United States Patent
D'Andrea et al.

(10) Patent No.: US 12,194,922 B2
(45) Date of Patent: *Jan. 14, 2025

(54) PIVOTABLE MOTOR VEHICLE MIRROR ASSEMBLY

(71) Applicant: Motherson Innovations Company Limited, London (GB)

(72) Inventors: Anthony P. D'Andrea, Attica, MI (US); Donald DePalma, Armada, MI (US); David Ren, Allenton, MI (US); Jeffrey Rode, Washington, MI (US); Alan Fraley, Marine City, MI (US); Douglas Wilson, Burtchville, MI (US)

(73) Assignee: Motherson Innovations Company Limited, London (GB)

(*) Notice: Subject to any disclaimer, the term of this patent is extended or adjusted under 35 U.S.C. 154(b) by 46 days.

This patent is subject to a terminal disclaimer.

(21) Appl. No.: 18/308,758

(22) Filed: Apr. 28, 2023

(65) Prior Publication Data
US 2023/0264630 A1    Aug. 24, 2023

Related U.S. Application Data

(63) Continuation-in-part of application No. 17/198,494, filed on Mar. 11, 2021, now Pat. No. 11,708,027.
(Continued)

(51) Int. Cl.
*B60R 1/078* (2006.01)
*B60R 1/064* (2006.01)
(Continued)

(52) U.S. Cl.
CPC .............. *B60R 1/074* (2013.01); *B60R 1/064* (2013.01); *B60R 1/1207* (2013.01); *B60R 2001/1253* (2013.01)

(58) Field of Classification Search
CPC .. B60R 1/02; B60R 1/06; B60R 1/062; B60R 1/07; B60R 1/074; B60R 1/078; B60R 1/12; B60R 1/1207; B60R 2001/1253
(Continued)

(56) References Cited

U.S. PATENT DOCUMENTS 4,558,930 A   12/1985   Deedreek
4,907,871 A   3/1990    Hou
(Continued)

*Primary Examiner* — Eret C McNichols
*Assistant Examiner* — Michael McDuffie
(74) *Attorney, Agent, or Firm* — Jones Day

(57) ABSTRACT

A telescoping mirror pivot assembly comprises a telescoping frame assembly, a central shaft, and a mirror head. The telescoping frame assembly may include a first end and a second end. The central shaft may be coupled to the first end of the telescoping frame assembly. The central shaft may include a detent manual fold arm. The detent manual fold arm may comprise a first detent and a second detent. The first detent may be configured to mechanically secure the telescoping frame assembly in a first position. The second detent may be configured to mechanically secure the telescoping frame assembly in a second position. The mirror head may be coupled to the second end of the telescoping frame assembly. The telescoping frame assembly may be configured to transition from the first position to the second position when a first force is applied in a first direction to the mirror head.

19 Claims, 24 Drawing Sheets

Related U.S. Application Data

(60) Provisional application No. 63/404,930, filed on Sep. 8, 2022, provisional application No. 62/992,860, filed on Mar. 20, 2020.

(51) Int. Cl.
*B60R 1/074* (2006.01)
*B60R 1/12* (2006.01)

(58) Field of Classification Search
USPC .... 248/475.1, 476, 480, 466, 479, 485, 486; 359/841, 877, 872, 873, 881, 876
See application file for complete search history.

(56) References Cited

U.S. PATENT DOCUMENTS

| | | |
|---|---|---|
| 5,483,385 A | 1/1996 | Boddy |
| 5,969,890 A | 10/1999 | Whitehead |
| 6,276,805 B1 | 8/2001 | Home et al. |
| 6,276,808 B1 | 8/2001 | Foote et al. |
| 6,394,616 B1 | 5/2002 | Foote et al. |
| 6,505,943 B1 | 1/2003 | Olijnyk et al. |
| 6,755,543 B1 | 6/2004 | Foote et al. |
| 6,863,407 B1 | 3/2005 | Olijnyk et al. |
| 6,877,868 B2 | 4/2005 | Olijnyk et al. |
| 7,159,992 B2 | 1/2007 | Foote |
| 7,267,449 B1 * | 9/2007 | Boddy .................... B60R 1/078 359/877 |
| 7,287,867 B2 | 10/2007 | Wellington et al. |
| 7,303,294 B1 | 12/2007 | Ruse et al. |
| 7,441,911 B2 | 10/2008 | Ruse et al. |
| 7,594,731 B2 | 9/2009 | Sinelli et al. |
| 7,748,857 B2 | 7/2010 | Fimeri et al. |
| 7,825,951 B2 | 11/2010 | Lang et al. |
| 7,866,835 B2 | 1/2011 | Liu |
| 9,057,833 B2 | 6/2015 | Bowers et al. |
| 11,358,527 B2 | 6/2022 | Wilson et al. |
| 11,708,027 B2 * | 7/2023 | Wilson .................... B60R 1/078 248/476 |
| 2008/0100939 A1 | 5/2008 | Brester |
| 2023/0264630 A1 * | 8/2023 | D'Andrea ............... B60R 1/074 359/872 |

* cited by examiner

PIVOTABLE MOTOR VEHICLE MIRROR ASSEMBLY

CROSS-REFERENCE TO RELATED APPLICATION

This application is a continuation-in-part of U.S. patent application Ser. No. 17/198,494, filed on Mar. 11, 2021, which claims priority to U.S. Provisional Patent Application No. 62/992,860, filed on Mar. 20, 2020; this application also claims priority to U.S. Provisional Patent Application No. 63/404,930, filed on Sep. 8, 2022; each of these priority applications are incorporated herein by reference in their entirety for all purposes.

FIELD

The present disclosure relates to motor vehicle external mirror assemblies.

BACKGROUND

The statements in this section merely provide background information related to the present disclosure and may not constitute prior art.

Power telescoping mirrors were developed to allow the mirror head to be extended or retracted by the user from inside a vehicle. The extension and retraction of the mirror can be controlled to accommodate different conditions desired by the user. These conditions include the width and length of the towing vehicle. One problem faced by power telescoping mirrors is supporting the weight of the mirror head and all accessories/features included in the mirror head when fully extended. A further problem faced is pivoting the mirror assembly including the telescoping structure needed to support a fully extended mirror head assembly Another problem is current telescoping mirrors pivot the mirror head or the mirror reflective element which limits the field of vision available. Information relevant to attempts to address these problems can be found in US20190016265, U.S. Pat. Nos. 7,172,298 and 6,726,337. However, each one of these references suffers from the disadvantages of a telescoping design which has a limited range for pivoting adjustment.

SUMMARY

In an example embodiment, a power telescoping mirror pivot assembly comprises a base frame, an upper bracket, a central shaft, a first telescoping arm assembly, a second telescoping arm assembly, a first powerfold motor, a second powerfold motor, and a mirror head. The base frame may include a lower arm. The upper bracket may be mounted to the base frame. The central shaft may extend between the lower arm and the upper bracket. The central shaft may include an upper portion and a lower portion. The first telescoping arm assembly may include a first end and a second end. The first end of the telescoping arm assembly may be coupled to the upper portion of the central shaft. The second telescoping arm assembly may include a first end and a second end. The first end of the second telescoping arm assembly may be coupled to the lower portion of the central shaft.

The first powerfold motor may be coupled to the first telescoping arm assembly. The first powerfold motor may be configured to rotate the first telescoping arm assembly about the central shaft. The second powerfold motor may be coupled to the second telescoping arm assembly. The second powerfold motor may be configured to rotate the second telescoping arm assembly about the central shaft. The mirror head may be coupled to the second end of the first telescoping arm assembly and the second end of the second telescoping arm assembly.

In another example, a telescoping mirror pivot assembly comprises a telescoping frame assembly, a central shaft, and a mirror head. The telescoping frame assembly may include a first end and a second end. The central shaft may be coupled to the first end of the telescoping frame assembly. The central shaft may include a detent manual fold arm. The detent manual fold arm may comprise a first detent and a second detent. The first detent may be configured to mechanically secure the telescoping frame assembly in a first position. The second detent may be configured to mechanically secure the telescoping frame assembly in a second position. The mirror head may be coupled to the second end of the telescoping frame assembly. The telescoping frame assembly may be configured to transition from the first position to the second position when a first force is applied in a first direction to the mirror head.

In another example, a method of operating a mirror head assembly comprises securing a first end of a telescoping frame assembly at a first position with a first detent on a detent manual fold arm of a central shaft. The second end of the telescoping frame assembly ay be coupled to a mirror head. The method may further comprise providing a manual force on the telescoping arm assembly. The method may further comprise removing the first end of the telescoping frame assembly from the first position and rotating the telescoping fame assembly about the central shaft based on the manual force. The method may further include securing the telescoping frame assembly at a second position with a second detent on the detent manual fold arm based on the rotation of the telescoping frame assembly.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Figure 1:
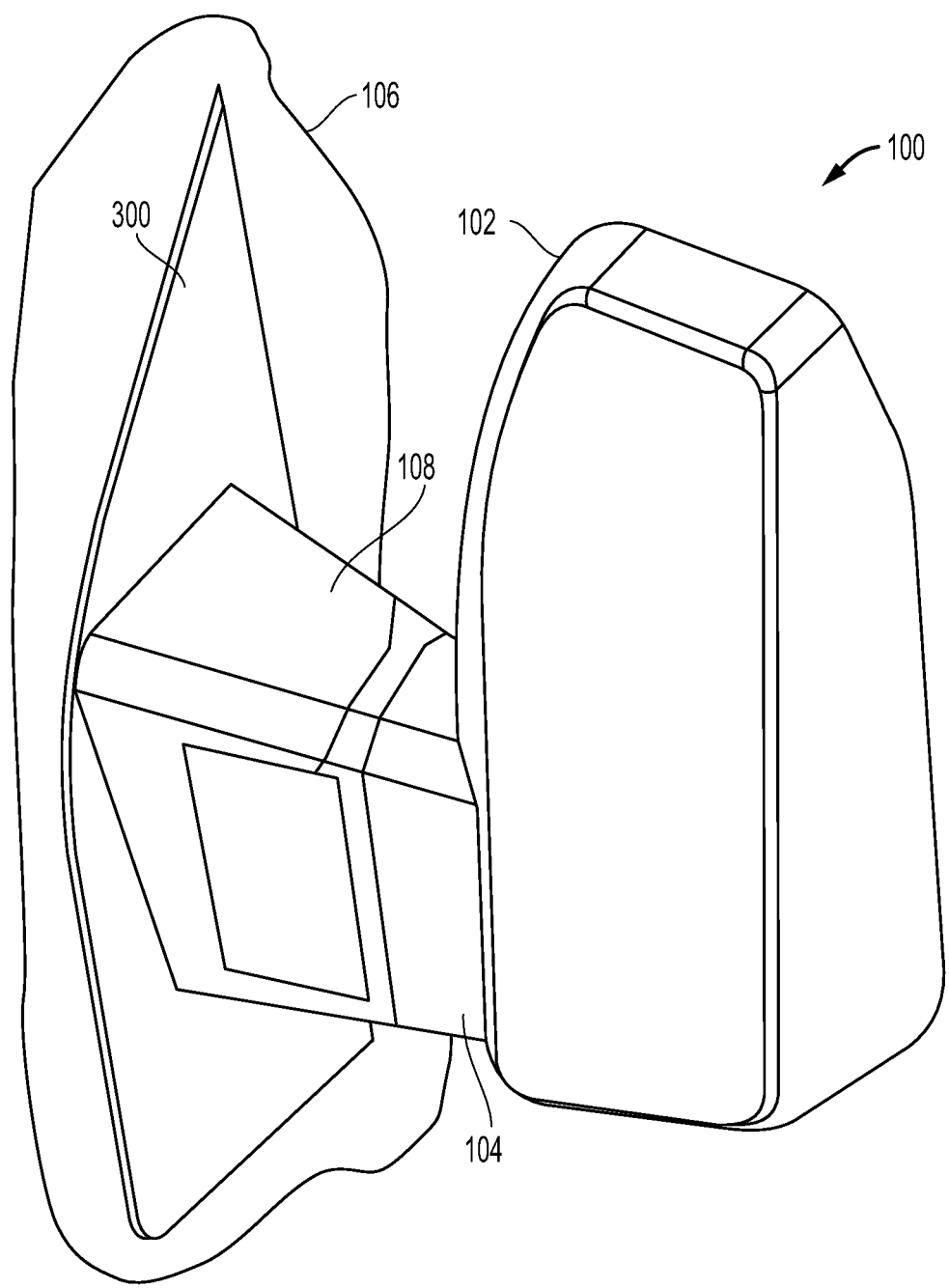
FIG. 1 is an isometric, assembled rear view of a pivotable telescoping mirror assembly, in accordance with some embodiments.

The following description is merely exemplary in nature and is not intended to limit the present disclosure, application, or uses. It should be understood that throughout the drawings, corresponding reference numerals indicate like or corresponding parts and features.

As shown in FIG. 1, the pivotable telescoping mirror assembly 100 contains a base frame 300 which is attached to a vehicle 106. The vehicle 106 mounting is typically the A-pillar and/or door panel of the vehicle however it is within the scope of this disclosure to mount the base frame 300 to other parts of the vehicle 106. The assembly has a base cover 108 which is fixed to the base frame 300. A second cover 104 is slidably attached to the base cover 108 and attached to the mirror head 102. The second cover 104 extends and retracts with the mirror head 102 during the telescoping movement of a mirror head 102. During the extension and retraction cycle, the base cover 108 and the second cover 104 are designed to overlap or are superimposed into one another during the telescoping cycle.

Figure 2:
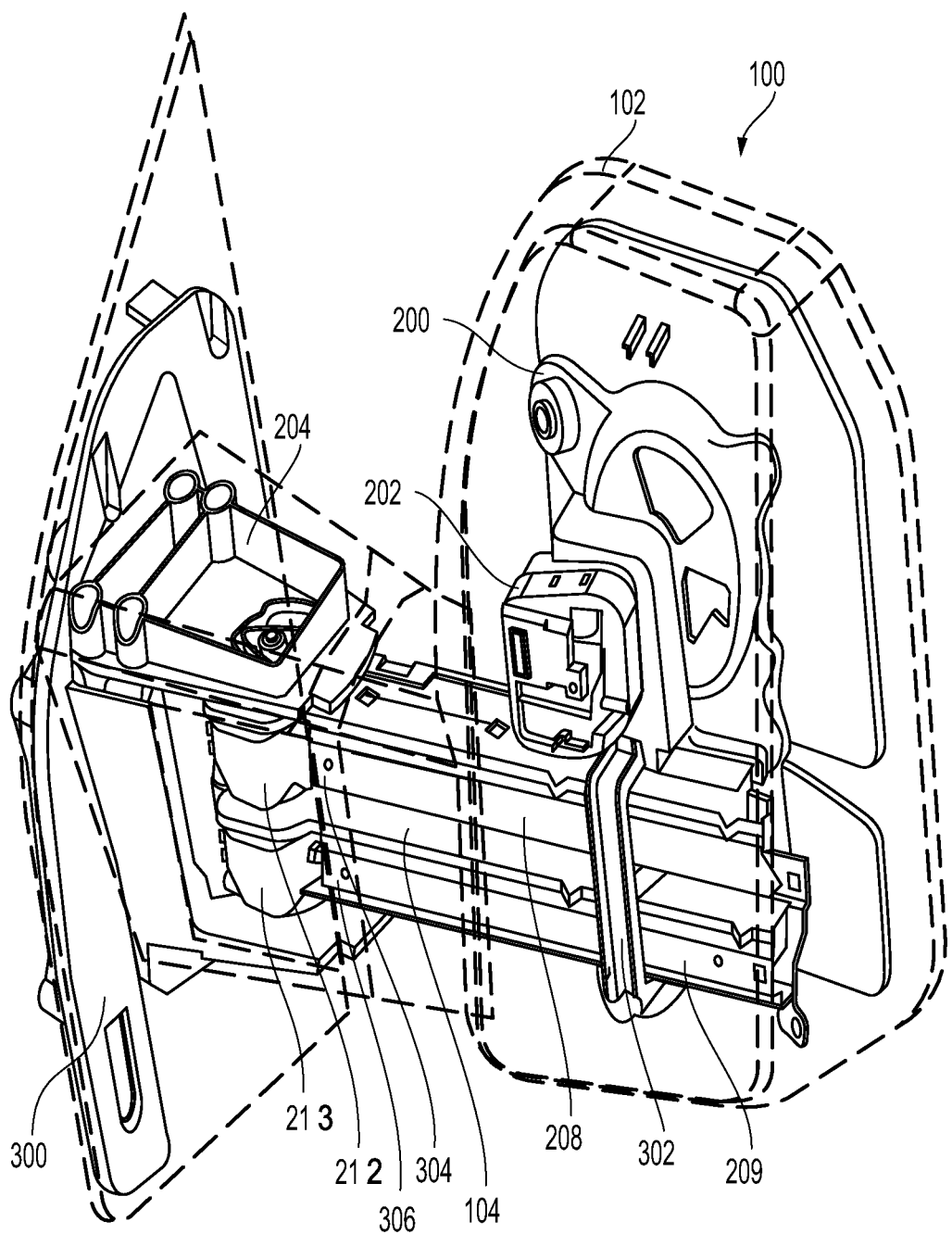
FIG. 2. is an isometric, assembled rear view with a transparent scalp and covers of the pivotable telescoping mirror assembly, in accordance with some embodiments.
Figure 3:
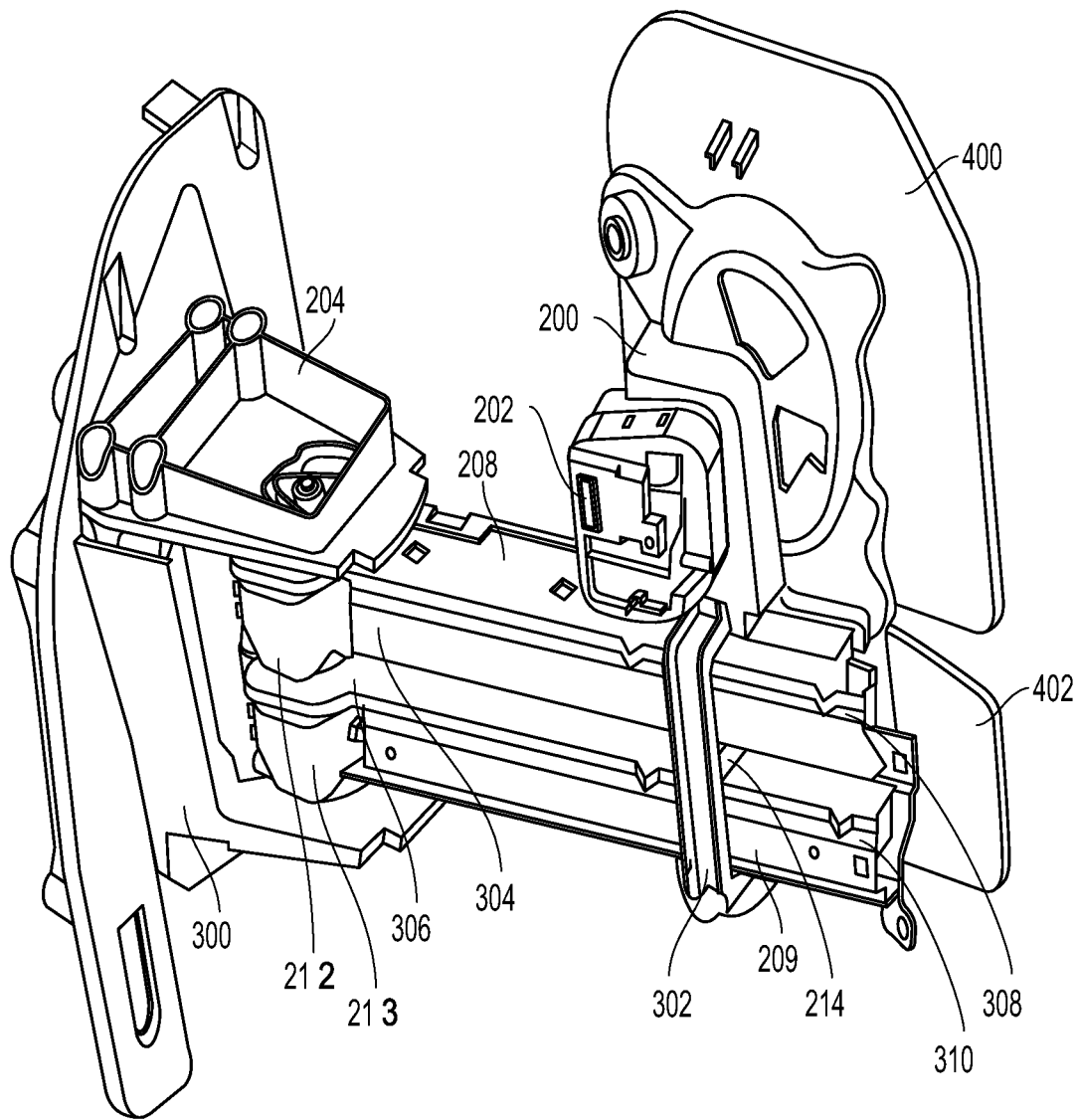
FIG. 3 is an interior isometric rear view of the pivotable telescoping mirror assembly, in accordance with some embodiments.
Figure 5:
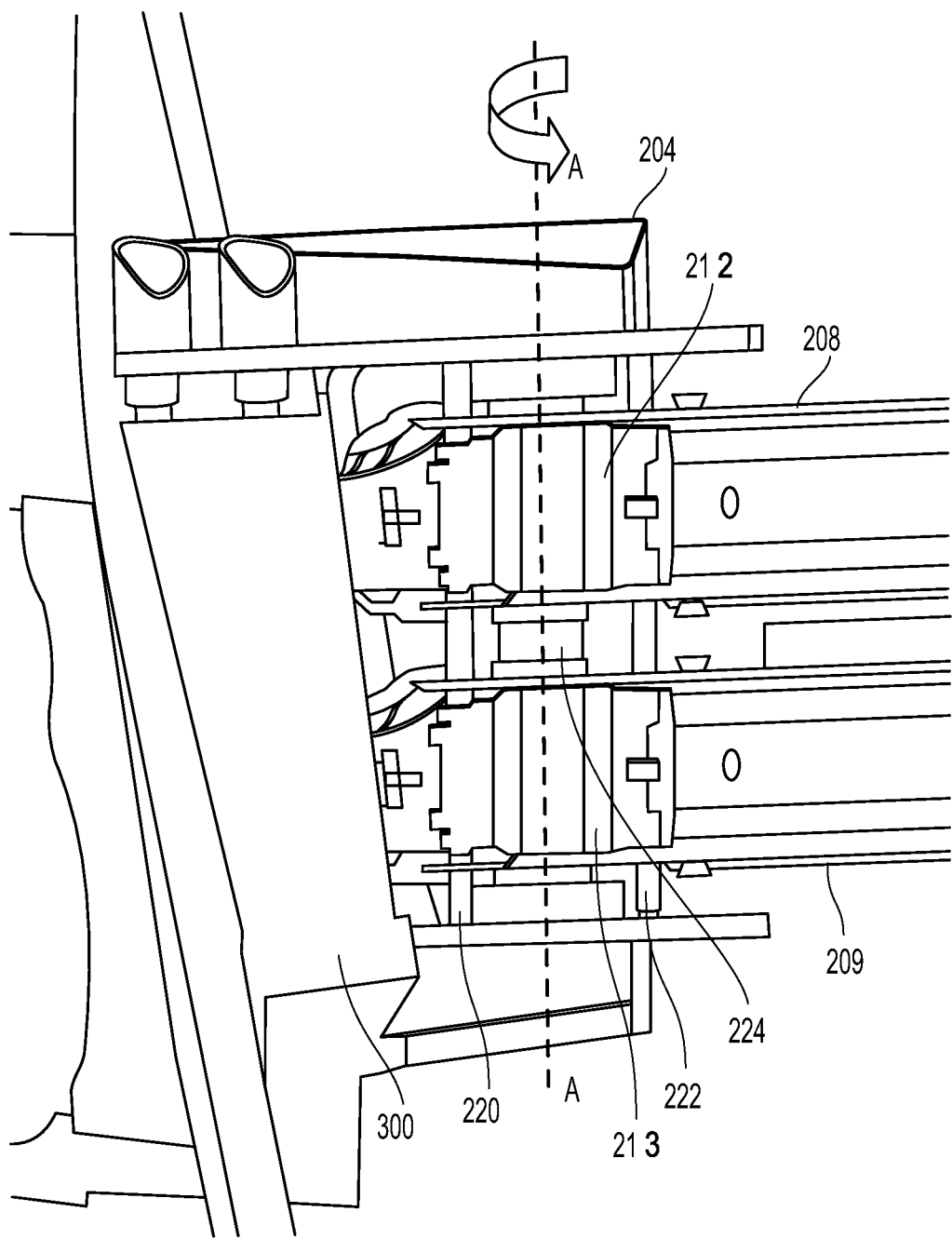
FIG. 5 is a rear view of the powerfold motor mounting system, in accordance with some embodiments.

FIGS. 2 and 3 illustrate the interior structure of the pivotable telescoping mirror assembly 100. An upper bracket 204 in cooperation with the base frame 300 provide a structural mounting location for a first powerfold motor 212 and a second powerfold motor 213. A first telescoping arm assembly 208 attaches to the first powerfold motor 212 at a first end 304. The second telescoping arm assembly 209 attaches to the second powerfold motor 213 at a first end 306. When the first and second powerfold motors 212, 213 are electrically engaged, they provide rotational movement to telescoping arm assemblies 208 and 209 around the axis A-A (FIG. 5). The first and second powerfold motors 212, 213 are not synchronized with each other. The first telescoping arm assembly 208 and second telescoping arm assembly 209 operationally connect each at a second end 308, 310 respectively to the telescoping motor 202, as best illustrated in FIG. 3. The telescoping motor 202 and the arm bracket 302 are attached to the telescoping frame 200. Arm bracket 302 can provide restriction in vertical movement and can maintain spacing between the first and second telescoping arm assemblies 208, 209. Arm bracket 302 has a support element 214 which is attached at bracket 302 and frame 200. The telescoping motor 202 when energized provides translational movement to extend and retract the second ends 308, 310 of the first and second telescoping arm assemblies 208, 209 with respect to vehicle 106 (shown in FIG. 1). The telescoping function is controlled by the telescoping motor 202 which drives thru both the first and second telescoping arm assemblies 208, 209. The first and second telescoping arm assemblies 208, 209 in the illustrated embodiment are identical but based on design limitations the first and second telescoping arms 208, 209 may be different.

In FIG. 3, a first reflective element 400 is the main mirror surface attached to the telescoping frame 200. A second reflective element 402 may be a spotter mirror attached to the telescoping frame 200. The first and second reflective elements 400, 402 rotate with the first and second telescoping arms 208, 209 when the first and second telescoping arms are rotated around axis A-A, as illustrated in FIG. 5. The first and second reflective elements 400, 402 experience translation movement to extend and retract with respect the vehicle 106 (shown in FIG. 1) when the second ends 308, 310 of the first and second telescoping arm assemblies 208, 209 are moved by the telescoping motor 202. The first and second reflective elements 400, 402 may also include features such as EC Glass, heated main glass and spotters, power actuated main and spotter glass, blind zone signal markers and/or approach lamps.

Figure 4:
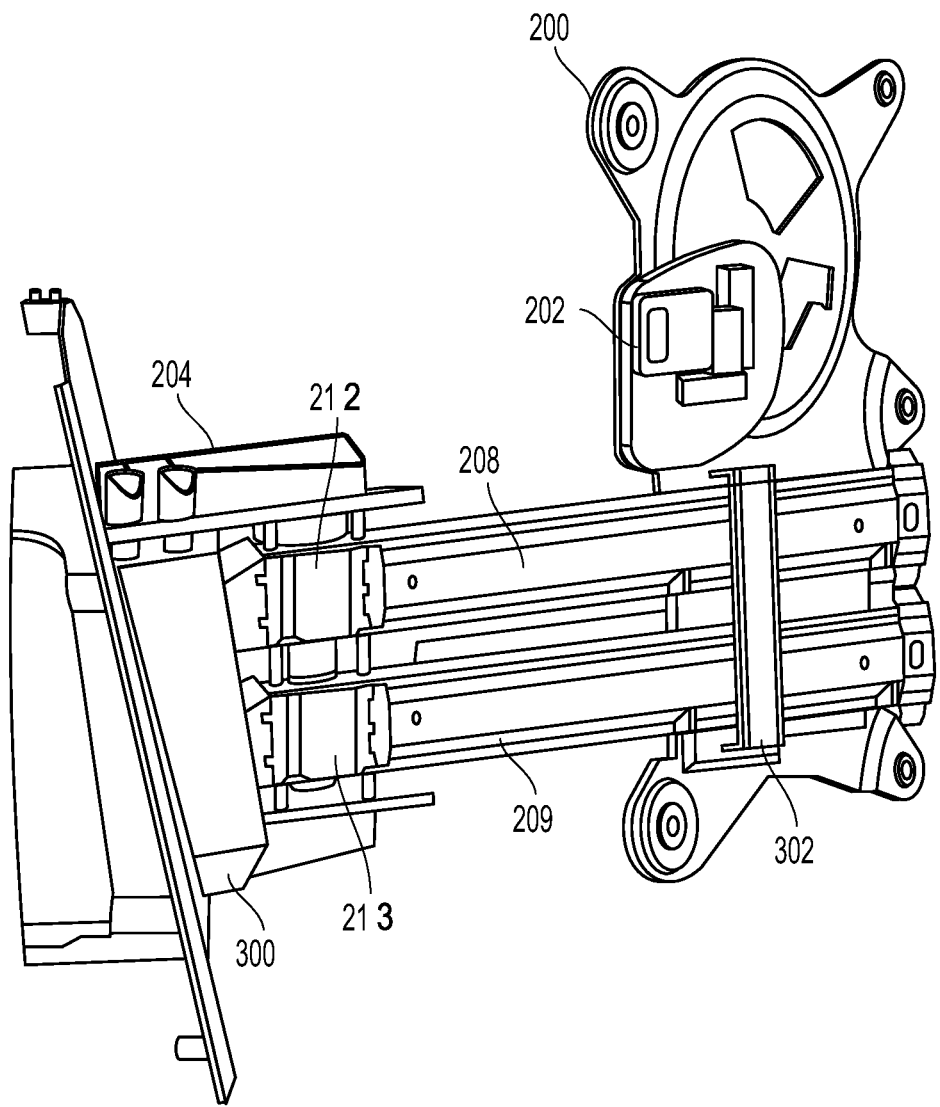
FIG. 4 is a rear view of the pivotable telescoping mirror assembly, in accordance with some embodiments.

In the exemplary example shown in FIG. 4, base frame 300 is shown supporting the powerfold motors 212, 213. The powerfold motors in this disclosure are identical powerfold motors but it is within the scope of this invention for the powerfold motors 212, 213 to be different.

In FIG. 5, base frame 300 includes an integral central shaft (FIG. 14) extending from the base frame 300 toward the upper bracket 204. Mounted on the central shaft are the second powerfold motor 213, a locking element 224, and the first powerfold motor 212. The first and second telescoping arm assemblies are also assembled with the central shaft at the first ends 304, 306. Additional parts may be added to the central shaft such as washers or bushings. The central shaft provides the rotational axis A-A for the rotational movement of the first and second telescoping arm assemblies 208, 209. The first powerfold motor 212 and the second powerfold motor 213 are connected by a first pin 220 and a second pin 222. A locking element 224 acts as a dimensional spacer between the first and second powerfold motor 212, 213 and connects the first and second powerfold motors 212, 213 to the central shaft. The central shaft for mounting the first and second powerfold motors and the first and second telescoping arm assemblies may be designed as a separate element from the base frame 300 which would then be connected to the base frame 300 and the upper bracket 204.

Figure 6:
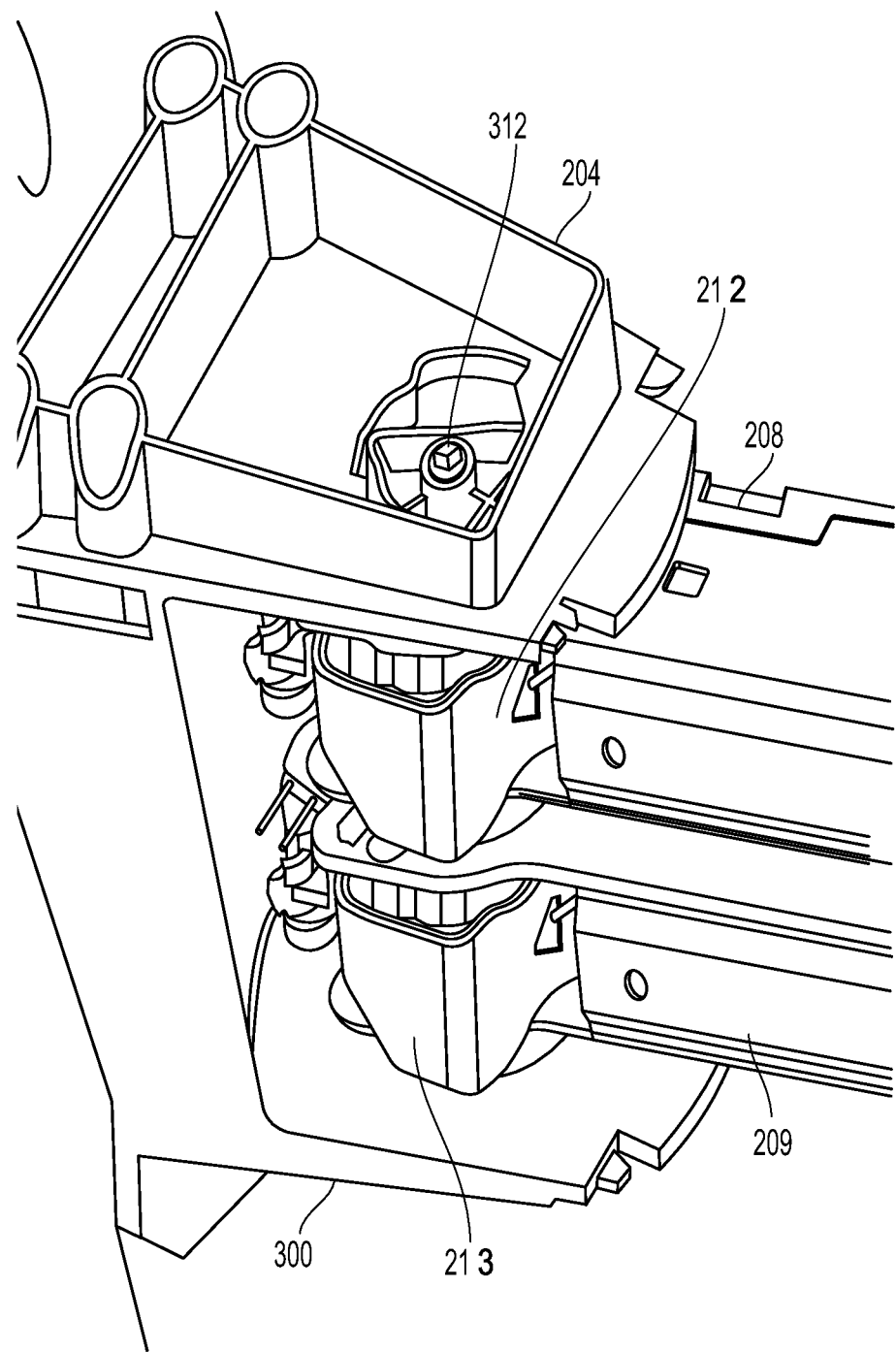
FIG. 6 is a top isometric view of the powerfold motor mounting system, in accordance with some embodiments.

FIG. 6 is an isometric view from a top perspective illustrating the attachment of the first telescoping arm assembly 208 to the first powerfold motor 212. As already illustrated in other figures, the first telescoping arm assembly 208 and the second telescoping arm assembly 209 are attached to the base frame 300 and connect to the first and second powerfold motors 212, 213. The first telescoping arm assembly 208 is connected at a top and a bottom surface of the first powerfold motor 212. Upper bracket 204 mounts to base frame 300 and to the central shaft (not shown) at fastener 312.

Figure 7:
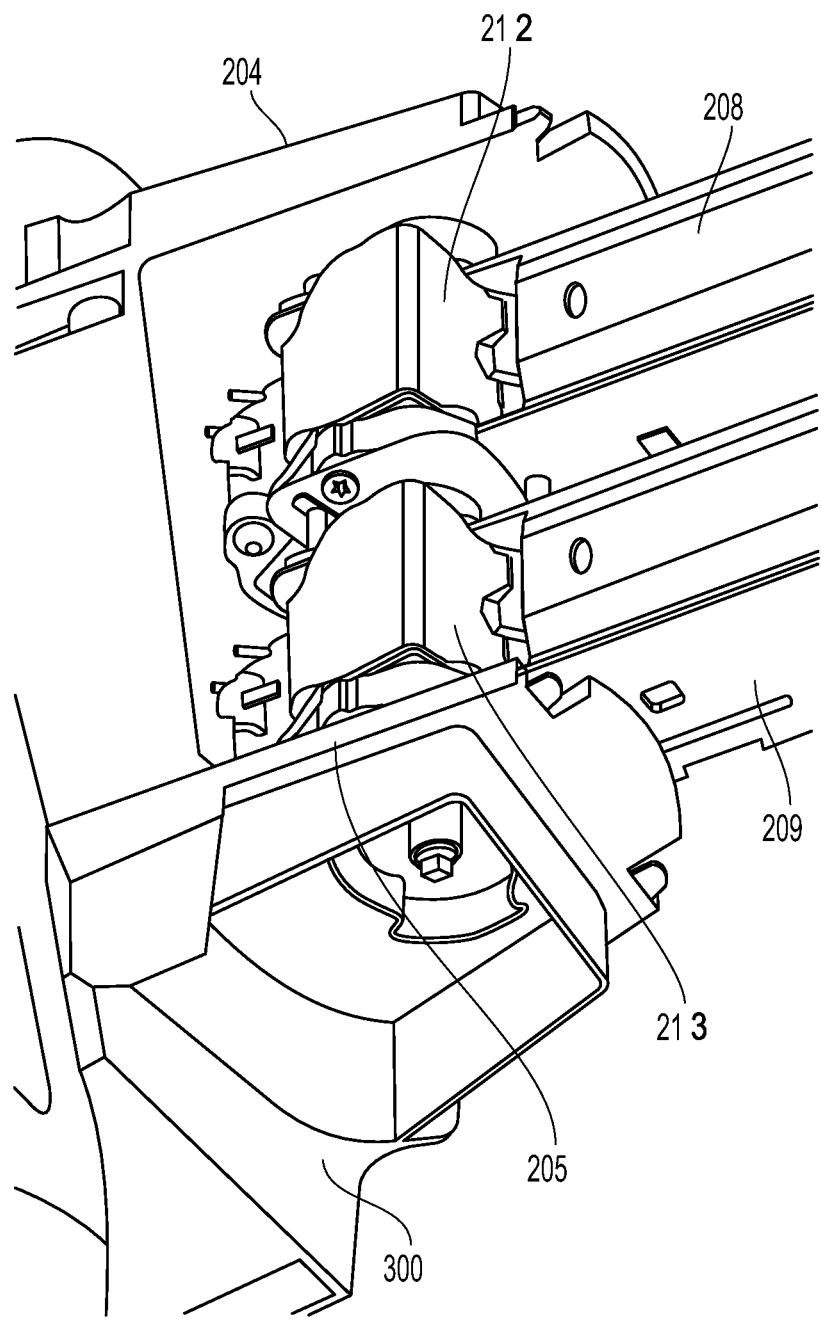
FIG. 7 is a bottom isometric view of the powerfold motor mounting system, in accordance with some embodiments.

FIG. 7 is an isometric view from a bottom perspective illustrating the attachment of the second telescoping arm assembly 209 to the second powerfold motor 213. As already illustrated in other figures, the first telescoping arm assembly 208 and the second telescoping arm assembly 209 are attached to the base frame 300 and connect to the first and second powerfold motors 212, 213. The second telescoping arm assembly 209 is attached to the second powerfold motor 213 at a top and a bottom surface of the second powerfold motor 213.

Figure 8:
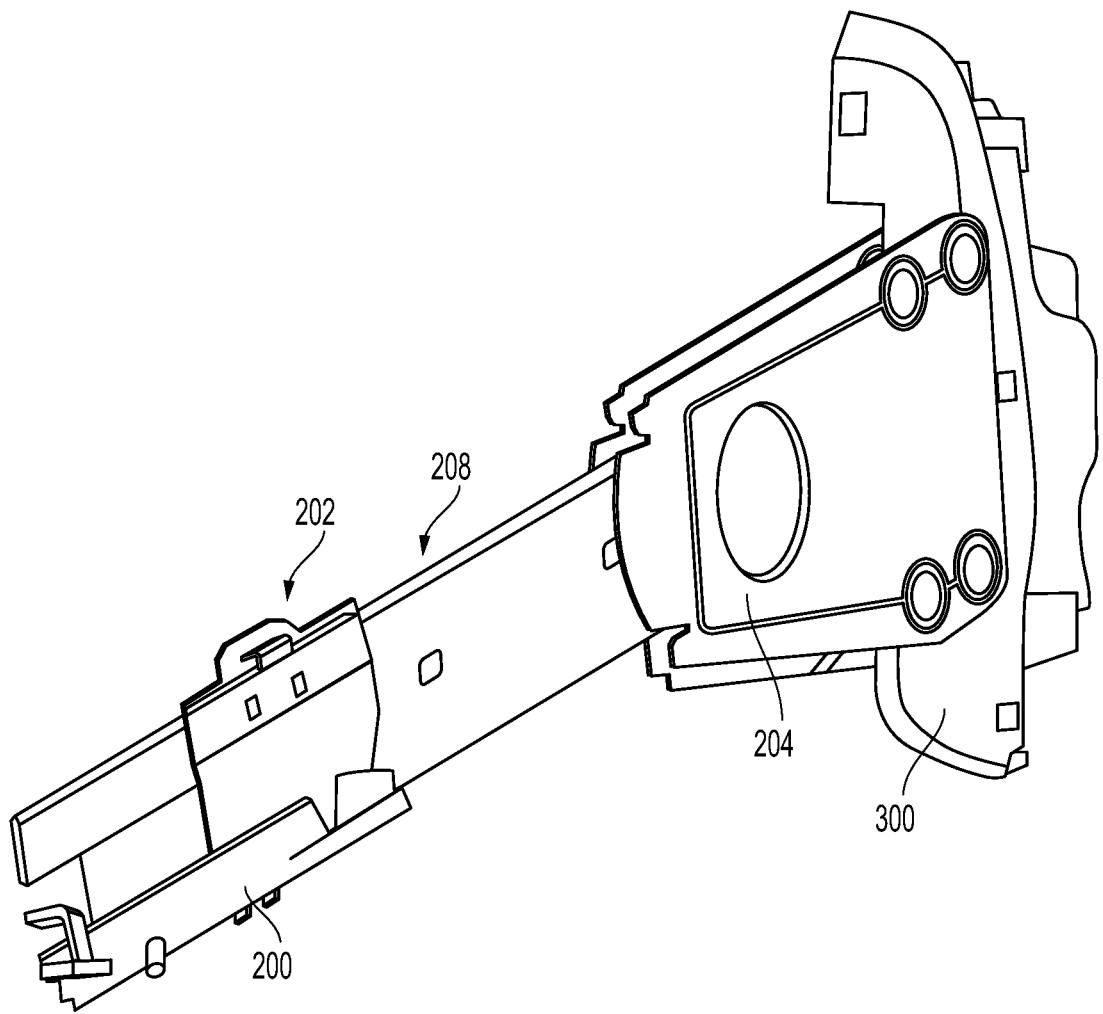
FIG. 8 is a top view of the pivotable telescoping mirror assembly structure, in accordance with some embodiments.

In FIG. 8, a top view of the upper bracket 204 is shown in relation to the base frame 300 and the first telescoping arm assembly 208. The telescoping motor 202 is shown attached to the back of the telescoping frame 200. This allows telescoping movement of the first and second reflective elements 400, 402.

Figure 9:
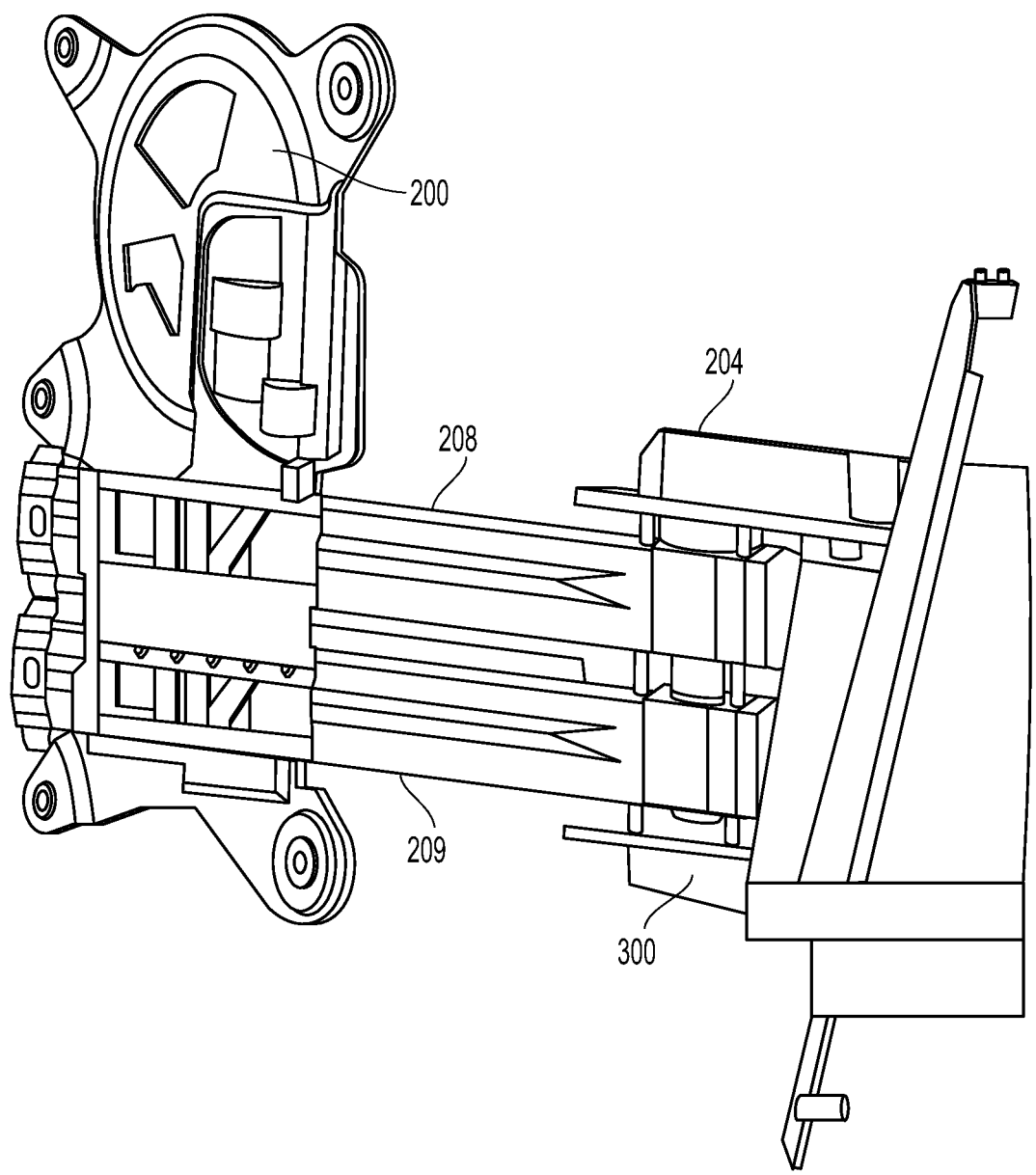
FIG. 9 is front view of the pivotable telescoping mirror assembly structure, in accordance with some embodiments.

FIG. 9 is a front view of the telescoping frame 200. In FIG. 9, the telescoping frame 200 is shown moveably attached to the first and second arm assemblies 208, 209 to allow for telescoping movement of the first and second reflective elements 400, 402. In addition, the upper bracket 204 is shown as attached to the base frame 300.

Figure 10:
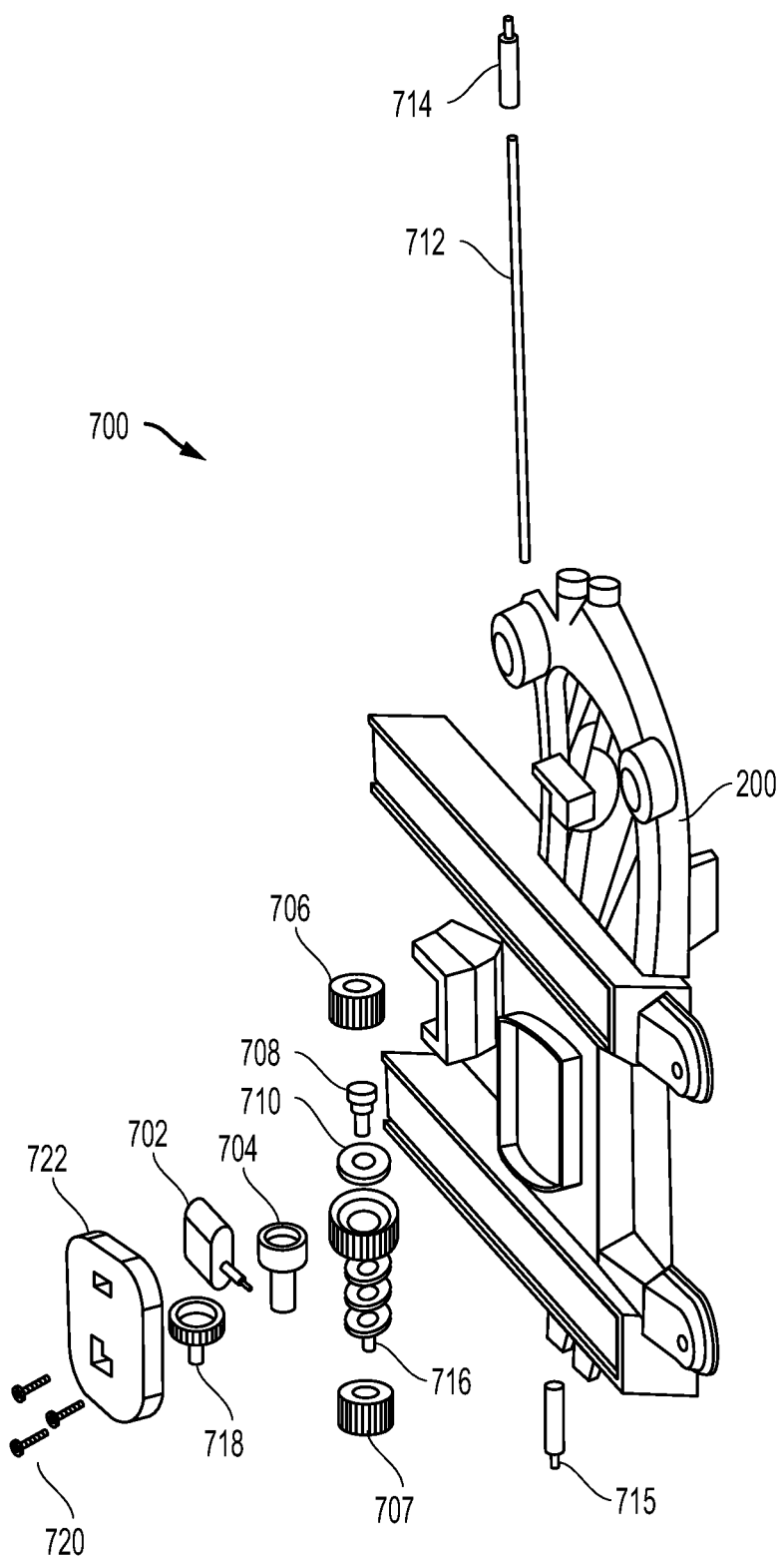
FIG. 10 is an exploded view of the telescoping mirror frame assembly, in accordance with some embodiments.

In FIG. 10, a telescoping frame assembly 700 of the telescoping frame 200 is shown in an exploded view. More specifically, the telescoping frame assembly 700 illustrates in more detail the elements of the telescoping motor 202 along as attached to the frame 200. The frame assembly 700 and telescoping motor 202 include elements 702, 704, 706, 708, 710, 707, 715, 716, 718, 720, which include various attachment features such as pins, screws, and washers 708, 710, 712, 714, 715, 720, motor gears or gear wheels 718, 707, 706, the motor and motor rod 702, 704, and a cover plate 722.

Figure 11:
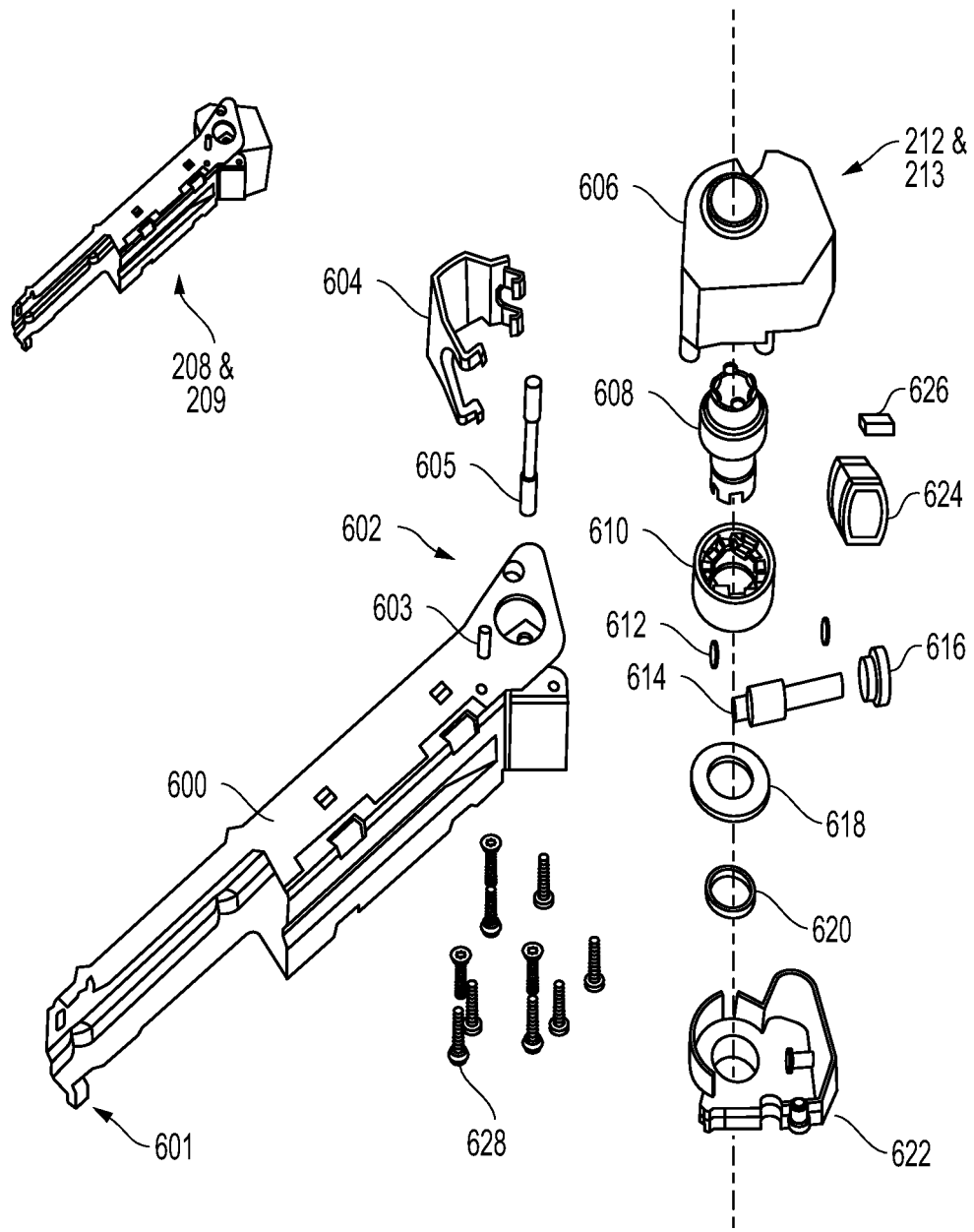
FIG. 11 is an exploded view of the telescoping arm assembly and powerfold motor, in accordance with some embodiments.

FIG. 11 illustrates an exploded view of the first and second telescoping arm assemblies 208 and 209. The first and second telescoping arm assemblies 208, 209 include elements 600, 601, 602, 603, 604, 605, 628 which include each arm 600, arm ends 601, 602, and attachment features such as pins, screws, washers, and brackets 603, 604, 605, 628. The first and second powerfold motors 212, 213 are also shown as an exploded view including elements 606, 608, 610, 612, 614, 616, 618, 620, 622, 624, 626 which include the motors, motor attachments features such as motor gears, cams, pins, screws, washers, and cover plates.

Figure 12:
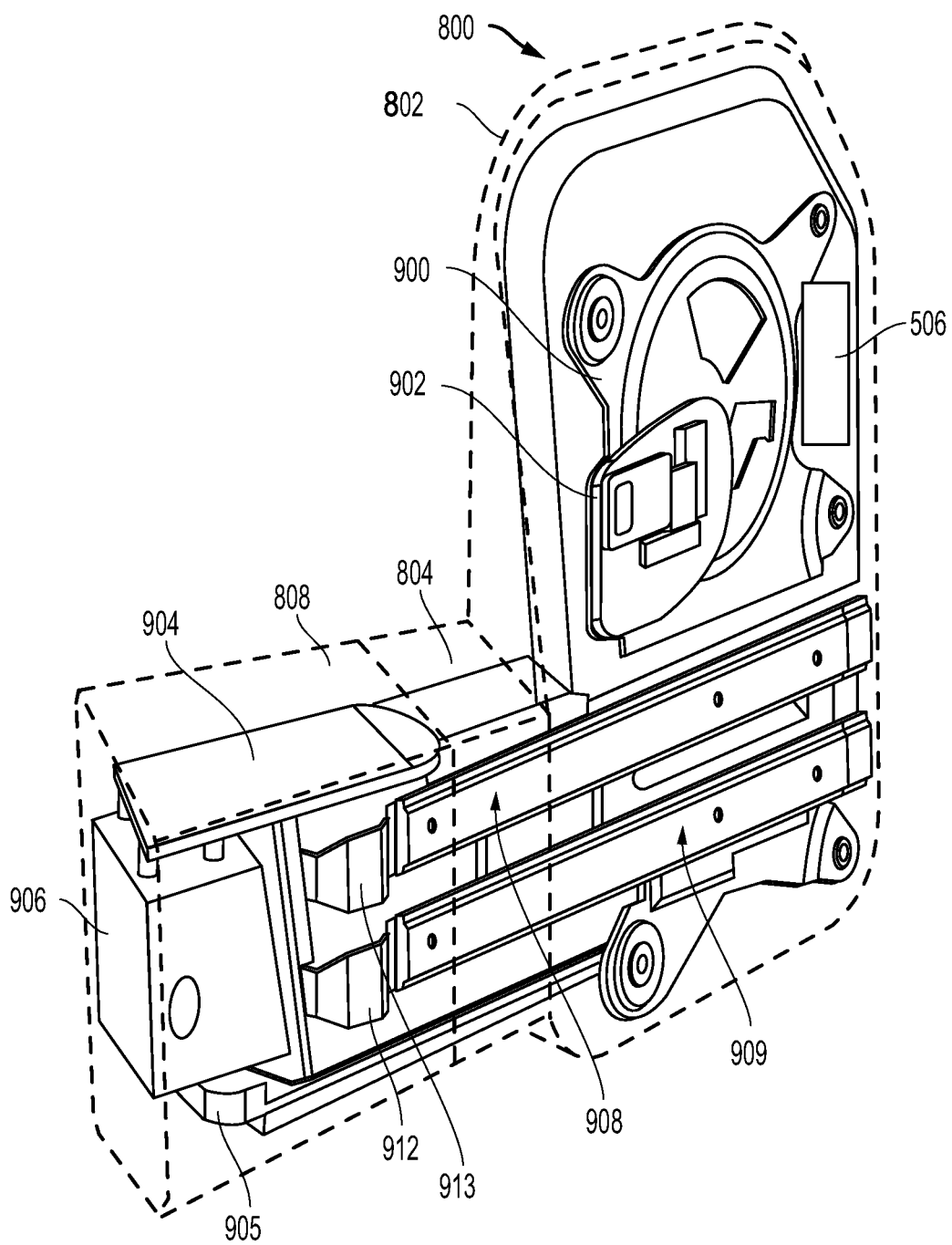
FIG. 12 is an isometric, assembled rear perspective of a second embodiment for the pivotable power telescoping mirror assembly, in accordance with some embodiments.

FIG. 12 shows a rear isometric view of a second pivoting power telescoping mirror assembly embodiment 800. A pivot mounting frame 906 is attached to an upper bracket 904 and a lower bracket 905. A base cover 808 is attached to the pivot mounting frame 906, and a slidable cover 804 is attached to the scalp 802 to slide in and out of the base cover 808 and form a slidable cover assembly 804, 808. A lower powerfold motor 912 and an upper powerfold motor 913 are mounted on a central shaft (FIG. 14) between the upper bracket 904 and the lower bracket 905. An upper telescoping arm assembly 908 and a lower telescoping arm assembly 909 are mounted to the upper and lower powerfold motors 912 and 913 and the central shaft in the method describe above for first and second powerfold motors 212, 213 connecting to first and second telescoping arm assemblies 208, 209. In this embodiment a first illumination module 506 is shown. This first illumination module 506 may be any kind of light module such as an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display and/or any combination thereof.

Figure 13:
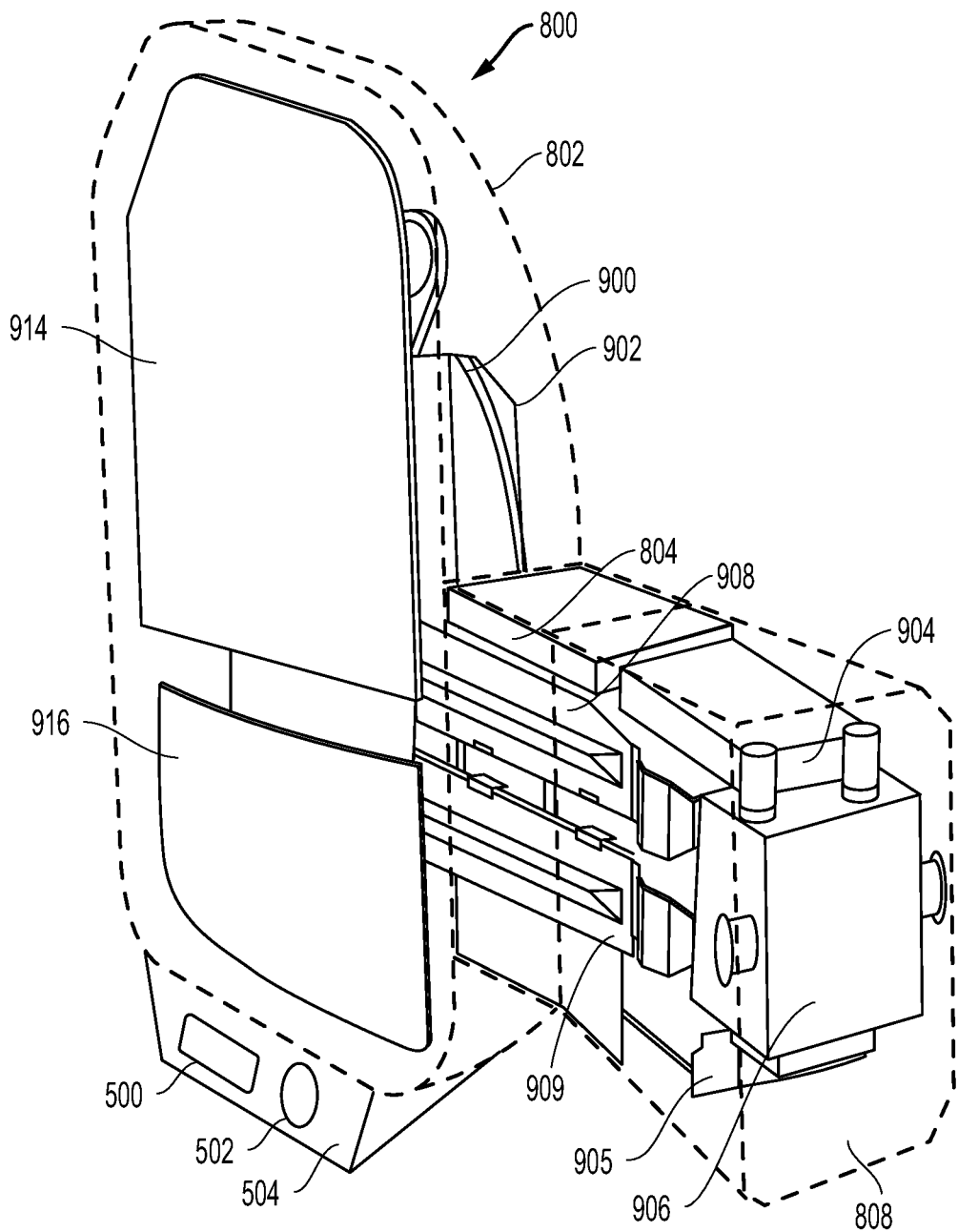
FIG. 13 is an isometric, assembled front perspective of a second embodiment for the pivotable power telescoping mirror assembly, in accordance with some embodiments.

A second illumination module 500 is seen attached on a case rear 504 in FIG. 13. The second illumination module 500 may be any type of illumination describe with respect to the first illumination module 506 and in any combination with the first illumination module 506. A camera 502 is mounted in the case rear 504 of mirror head assembly 800. The camera 502 may have functions and devices to enhance, extend and/or sustain the functionality of the rearview device during normal or extreme conditions. These devices can comprise heating and/or cooling means, cleaning means such as wipers, liquid and/or gaseous sprays, actuator means for moving the rearview device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore camera 502 can include linear tracks and/or rotating wheels, like for example a filter wheel, for exchanging optical elements, comprising for example lenses, mirrors, light sources, sensors, and adaptive optics like deformable mirrors and/or filters. The camera 502 may also be fixed (stationary mounted) or dynamic and move with the mirror head 800 during extension cycle of the upper and lower telescoping arm assemblies 908, 909. The movement of the upper and lower telescoping arm assemblies 908, 909 are identical to the first and second telescoping arm assembly 208, 209 described above. Mirror head assembly may also include sensors to provide input to the vehicle 106. Examples of sensors could include a light sensor, a rain sensor, a temperature sensors, radar, Wi-Fi and ultrasonic sensors.

Figure 14:
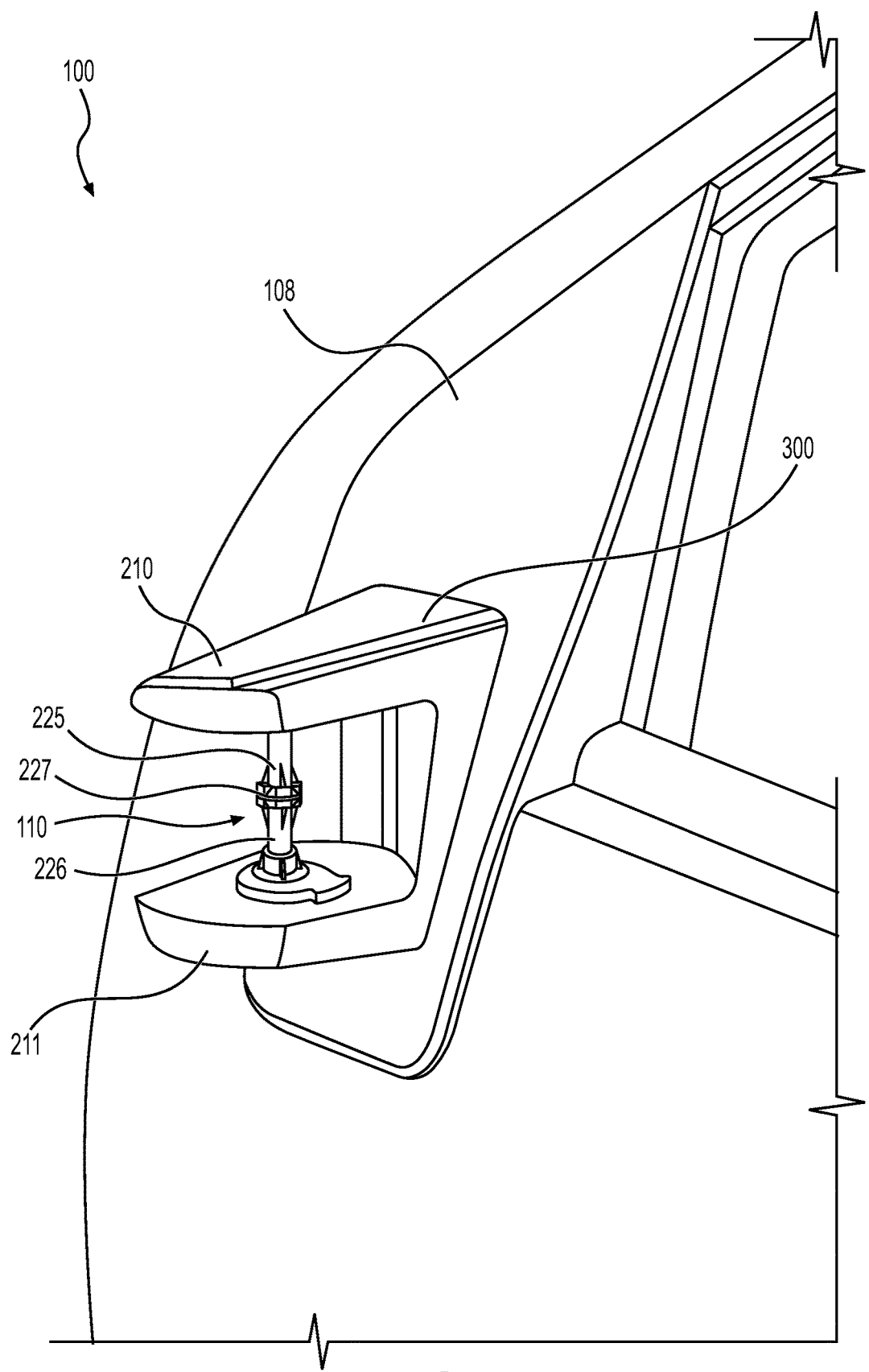
FIG. 14 depicts a pivotable telescoping mirror assembly with the mirror head and arm cover removed, in accordance with some embodiments.

FIG. 14 depicts a pivotable telescoping mirror assembly with the mirror head and arm cover removed, in accordance with some embodiments. As shown, the pivotable telescoping mirror head assembly 100 includes a base frame 300 with an upper arm 210 and a lower arm 211. In some example embodiments, the upper arm 210 is the upper bracket 204. The pivotable telescoping mirror assembly 100 further includes a central shaft 110. The central shaft 110 may include an upper portion 225 attached to the upper arm 210 of the base frame 300. The central shaft 110 may further include and a lower portion 226 that is attached to the lower arm 211 of the base frame 300. The central shaft 110 may further include a central portion 227 positioned between the upper portion 225 and the lower portion 226. As shown in FIG. 14, an example embodiment of the base cover 108 may extend to an area of a door 230 of the vehicle 106. This may provide additional support for the base frame 300.

Figure 15:
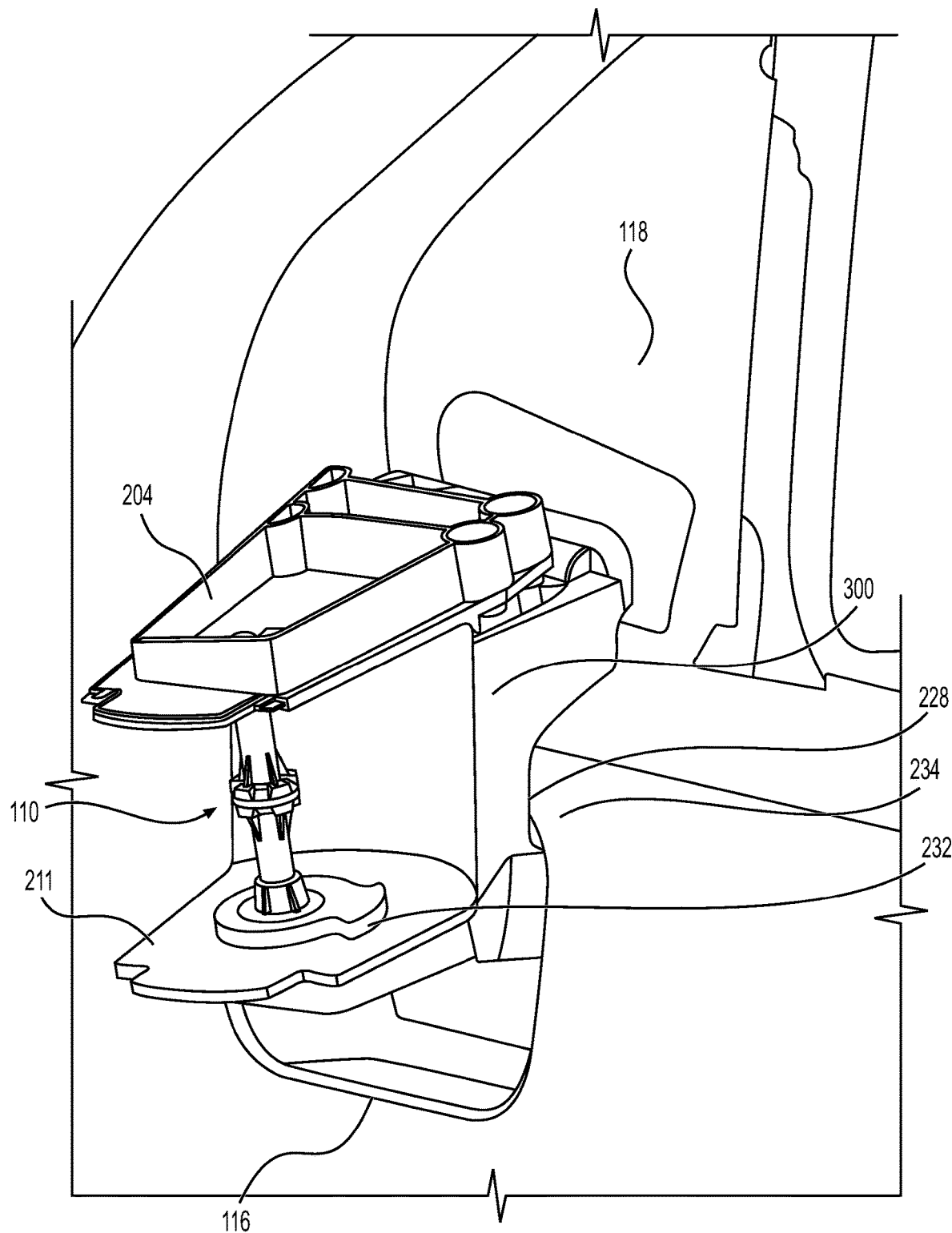
FIG. 15 depicts another view of the mirror head assembly with the mirror head and the base cover removed, in accordance with some embodiments.

FIG. 15 depicts another view of the mirror head assembly with the mirror head and the base cover removed, in accordance with some embodiments. The lower arm 211 of the base frame 300 attaches to the vehicle door 230 through a sheet metal pedestal opening 116. The upper bracket 204 attaches to the door of the vehicle 106 at a sheet metal patch area 118. The vehicle door 230 may include a base frame support protrusion 234. The base frame 300 may further include a step sheet metal patch 228 positioned between the upper bracket 204 and the lower arm 211. The step sheet metal patch 228 may partially surround the base frame support protrusion 234 of the vehicle door 230. The base frame support protrusion 234 may thus support the base frame 300 and other components of the pivotable telescoping mirror assembly 100. As shown in FIG. 15, the lower arm 211 may include a rotation recess 232 that provides a recess for the second powerfold motor 213 to occupy.

Figure 16:
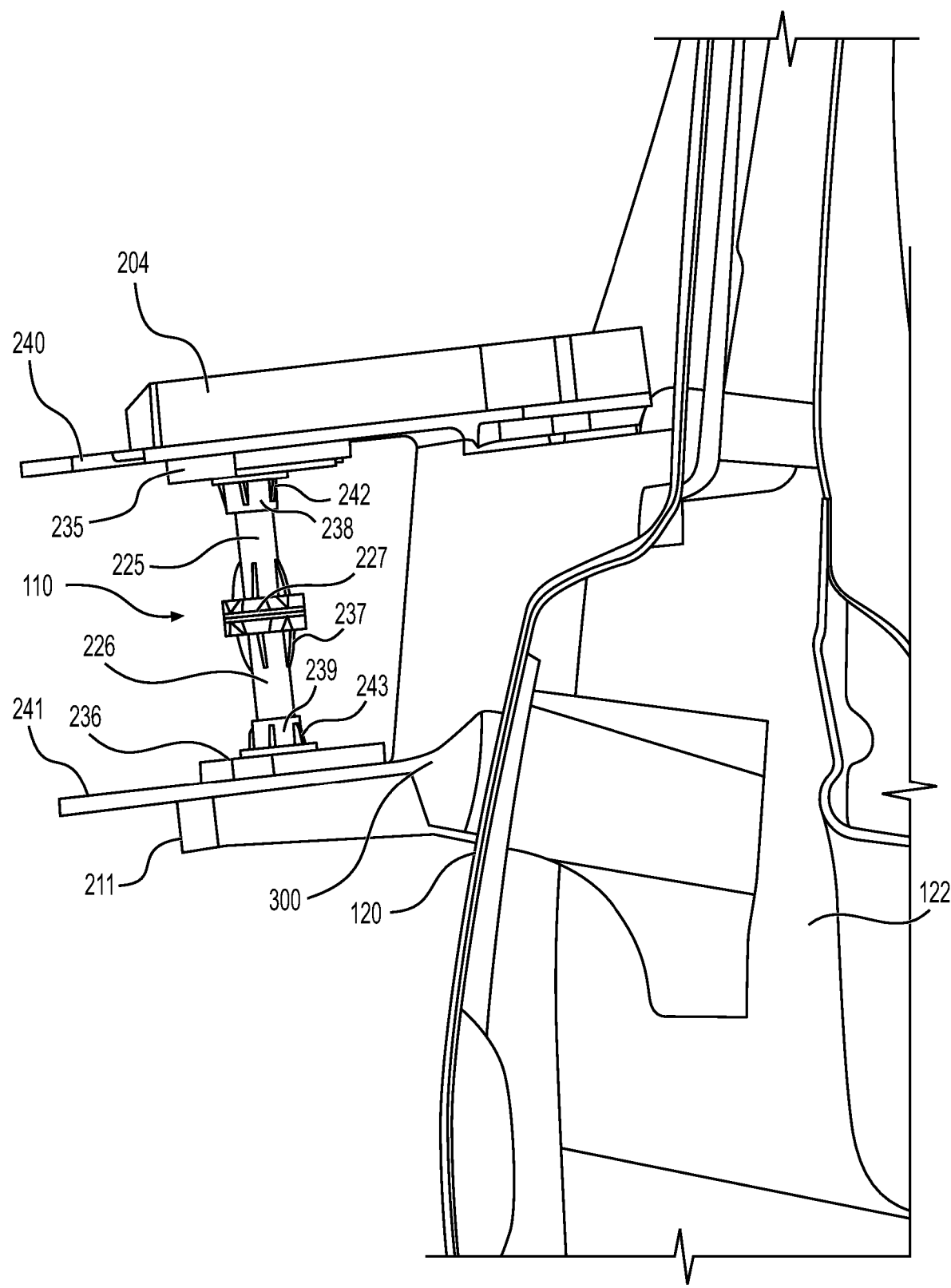
FIG. 16 depicts a side view of the upper bracket, the base frame, and the central shaft through a cut-away view of the vehicle door, in accordance with some embodiments.

FIG. 16 depicts a side view of the upper bracket, the base frame, and the central shaft through a cut-away view of the vehicle door, in accordance with some embodiments. As shown in FIG. 16, the lower arm 211 of the base frame 300 attaches to the door of the vehicle 106 at a sheet metal inner reinforcement 122 through the sheet metal pedestal opening 116, and the upper bracket 204 attaches to the door of the vehicle 106 at the sheet metal patch area 118. The upper bracket 204 may include an upper plate 240 extending laterally away from the vehicle door. The lower arm 211 of the base frame 300 may include a lower plate extending laterally away from the vehicle door 230. A lower side of the upper plate 240 may be coupled to an upper mounting protrusion 235. An upper side of the lower plate 241 may be coupled to a lower mounting protrusion 236. The upper mounting protrusion 235 may provide sufficient spacing between the upper plate 240 and the first telescoping arm assembly 208 such that the first telescoping arm assembly 208 can rotate about the central shaft 110. Furthermore, the lower mounting protrusion 236 may provide sufficient spacing between the lower plate 241 and the second telescoping arm assembly 209 such that the second telescoping arm assembly 209 can rotate about the central shaft 110.

As shown in FIG. 16, the upper bracket 204 may include an upper securing component 238 coupled to a lower side of the upper mounting protrusion 235. The lower arm 211 of the base frame 300 may include a lower securing component 239 coupled to an upper side of the lower mounting protrusion 236. The upper securing component 238 may include a hollow inner area. The hollow inner area of the upper securing component 238 may be used to secure the upper portion 225 of the central shaft. Furthermore, the lower securing component 239 may include a hollow inner area. The hollow inner area of the lower securing component 239 may be used to secure the lower portion 226 of the central shaft 110. As shown in FIG. 16, the upper securing component 238 may include a plurality of teeth 242 positioned along an outer surface of the upper securing component 238. The lower securing component 239 may also include a plurality of teeth 243 positioned along its outer surface. As depicted in FIG. 16, the central shaft 110 may further include a plurality of teeth 237 coupled to upper and lower sides of the central portion 227. The plurality of teeth 237 coupled to the upper side of the central portion 227 may extend along the upper portion 225 of the central shaft 110 and the plurality of teeth 237 coupled to the lower side of the central portion 227 may extend along the lower portion 226 of the central shaft 110.

Figure 17:
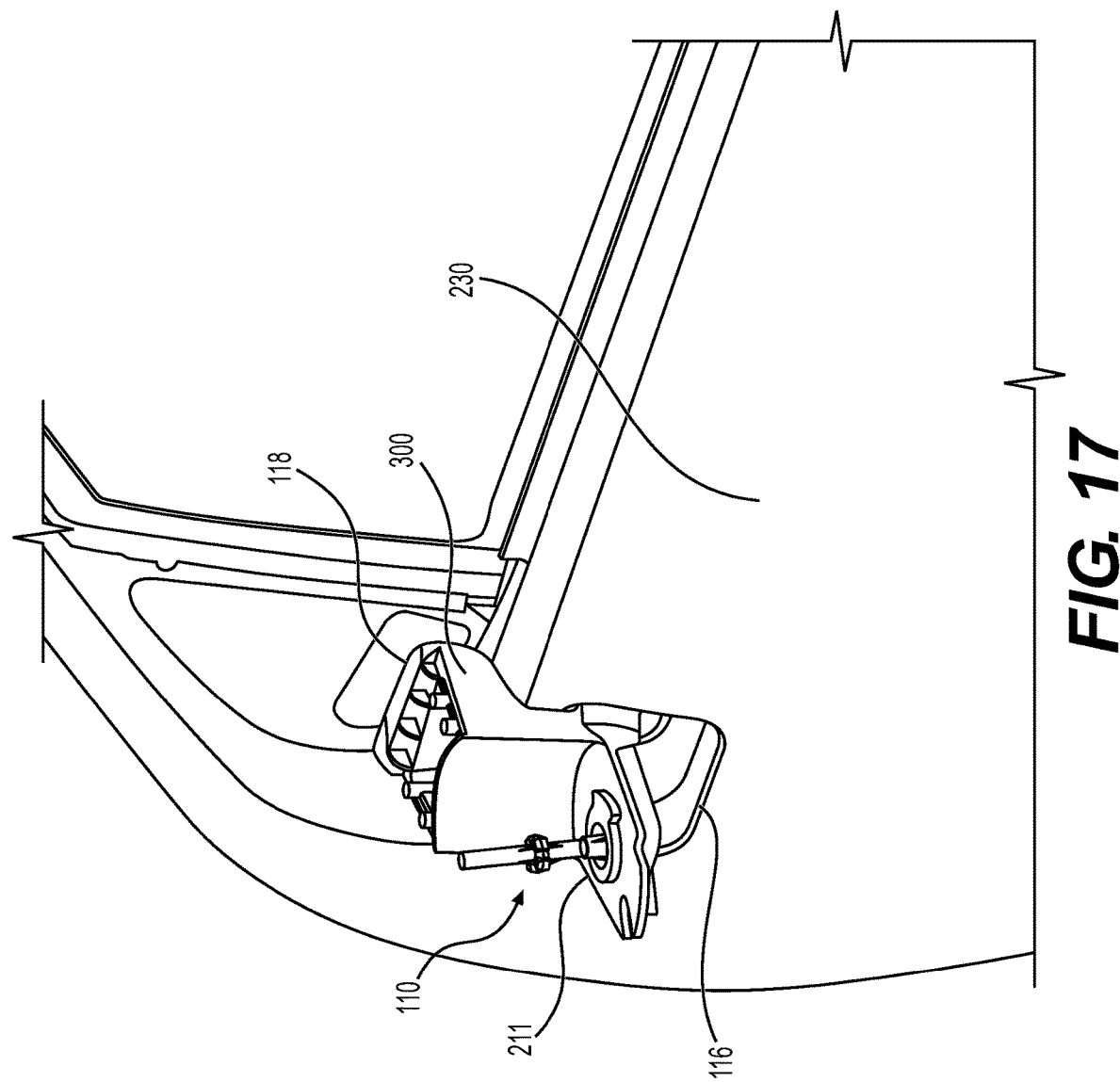
FIG. 17 depicts another view of the example mirror head assembly further showing attachment of the base frame to the vehicle door at the sheet metal patch area and through the sheet metal pedestal opening, in accordance with some embodiments.

FIG. 17 depicts another view of the example mirror head assembly further showing attachment of the base frame to the vehicle door at the sheet metal patch area 118 and through the sheet metal pedestal opening 116, in accordance with some embodiments. As shown in FIG. 17, the step sheet metal patch 228 may be positioned between the sheet metal patch area 118 and the sheet metal pedestal opening 116. The step sheet metal patch 228 may support the base frame 300 and other components of the pivotable telescoping mirror assembly 100. For example, the step sheet metal patch 228 may prevent the pivotable telescoping mirror assembly 100 from moving up or down relative to the vehicle door 230. As also shown in FIG. 17, the central shaft 110 may be positioned substantially vertically.

As shown in FIGS. 15-17, the base frame 300 is attached to the vehicle 106 through both the sheet metal pedestal opening 116 and the sheet metal patch area 118. The base frame 300 has a step sheet metal patch 228 which curves around the metal of the door 230 to allow the mirror assembly 100 to be fixed in two locations of the door 230, which can improve stability. In some examples, a different style of mirror assembly is fixed to the vehicle door 230 only by the sheet metal patch area 118. This reduces costs and improves manufacturing capability by allowing the same door 230 to be used for two different styles of mirror assemblies.

Figure 18:
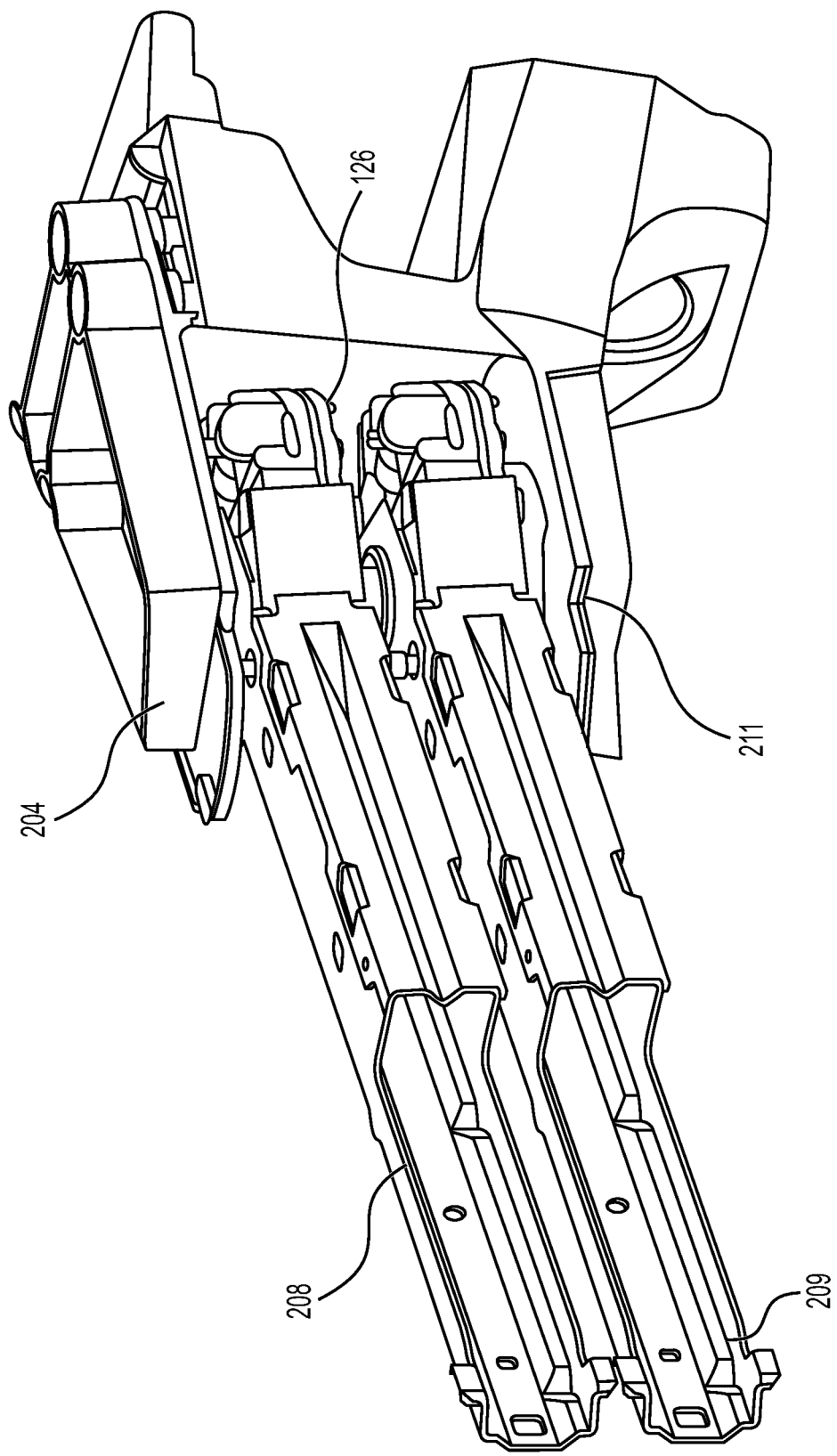
FIG. 18 depicts an example of dual power fold arms for the example mirror head assembly of FIG. 1, in accordance with some embodiments.

FIG. 18 depicts an example of dual power fold arms for the example mirror head assembly of FIG. 1, in accordance with some embodiments. As shown, the first telescoping arm assembly 208 and the second telescoping arm assembly 209 are pivotably attached to the upper portion 225 and the lower portion 226 of the central shaft 110 and may be rotated about the central shaft 110 (see, e.g., FIGS. 22 and 25) to fold the mirror head assembly 100 in the direction of the vehicle door 230. In the illustrated embodiment, the first and second telescoping arm assemblies 208, 209 are mechanically controlled by power fold mechanics 126 which may, for example, be controlled by a driver of the vehicle 106 to cause the mirror head assembly 100 to fold or unfold.

Figure 19:
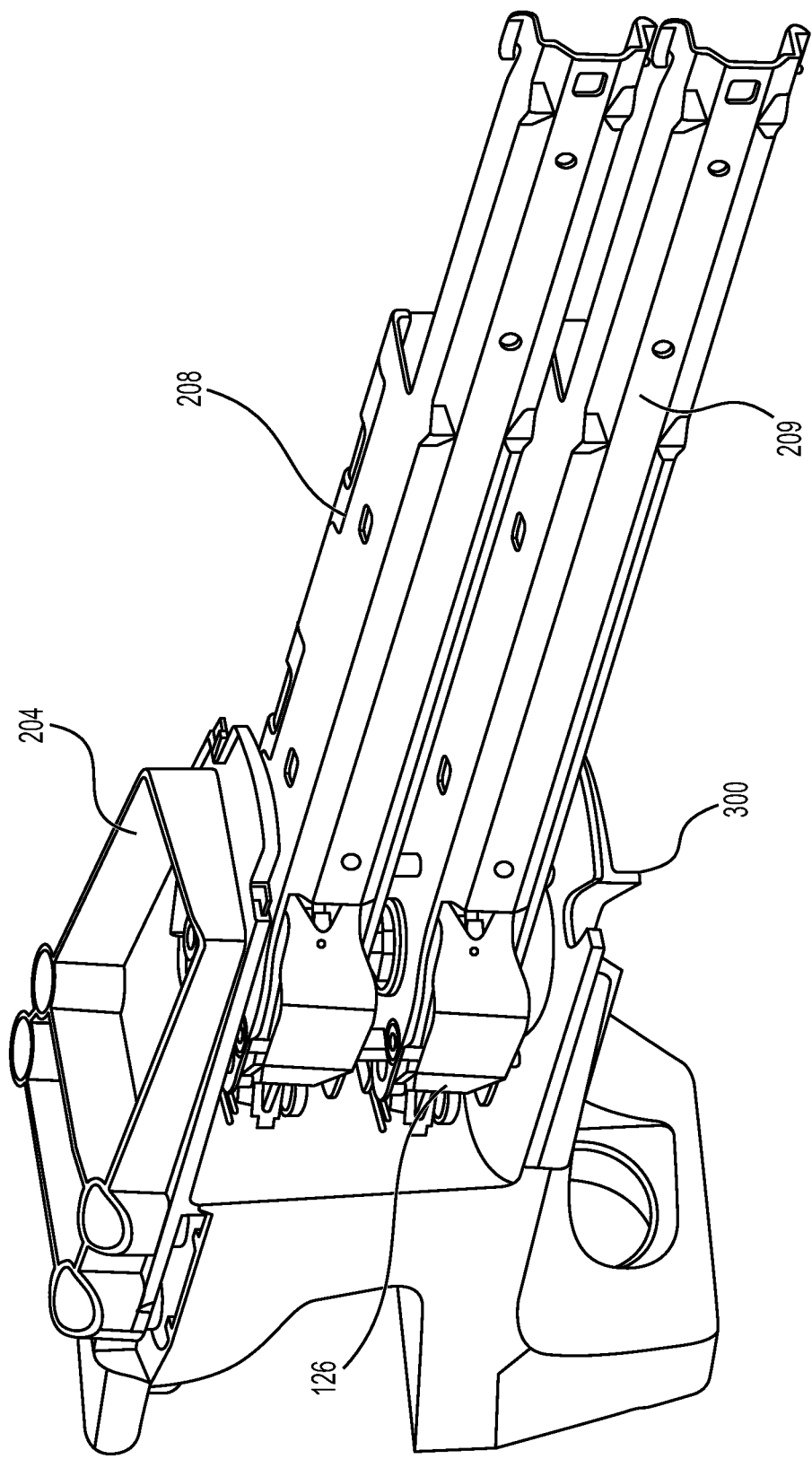
FIGS. 19-21 show additional views of the example first and second telescoping arm assemblies, in accordance with some embodiments.
Figure 20:
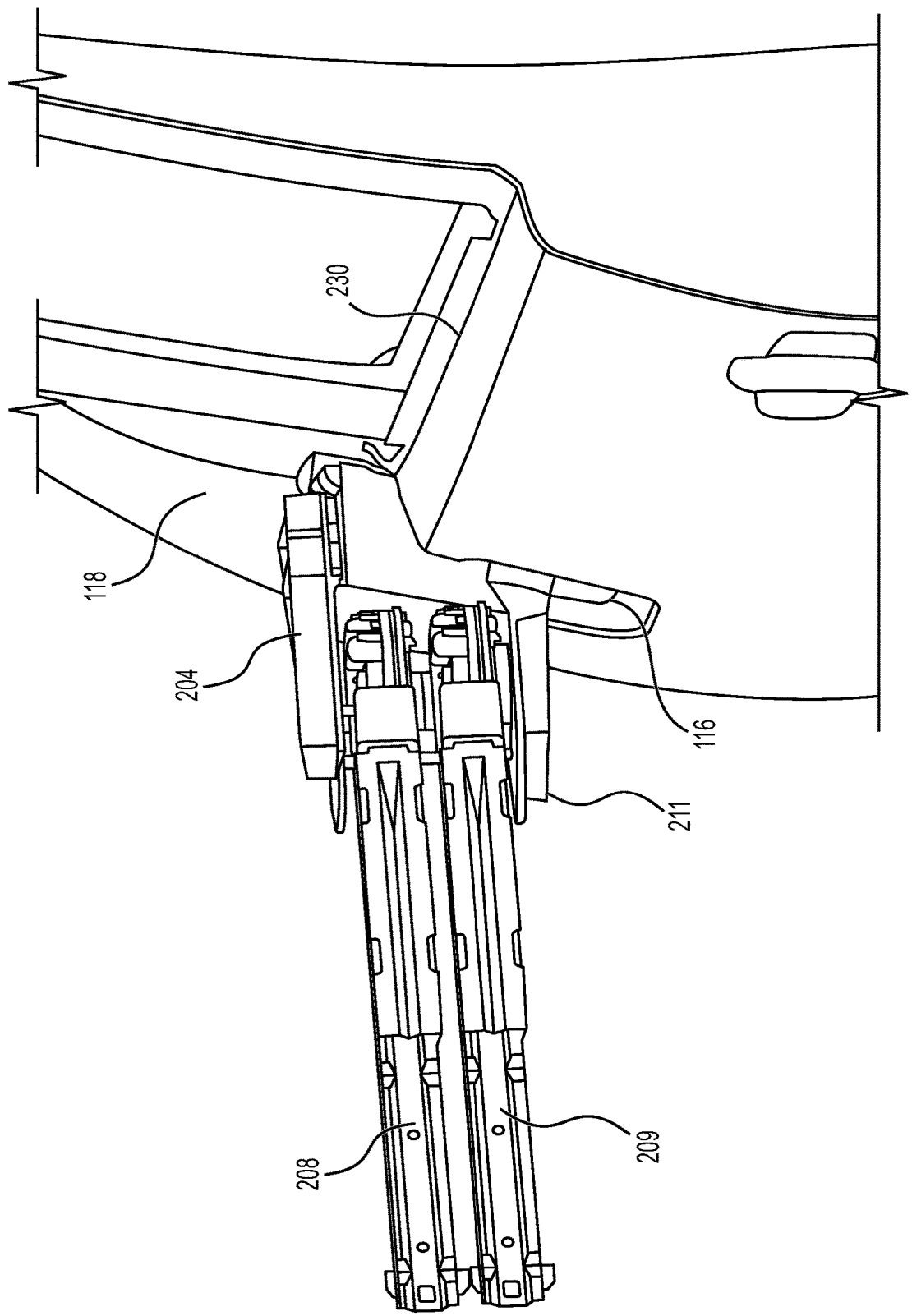
Figure 21:
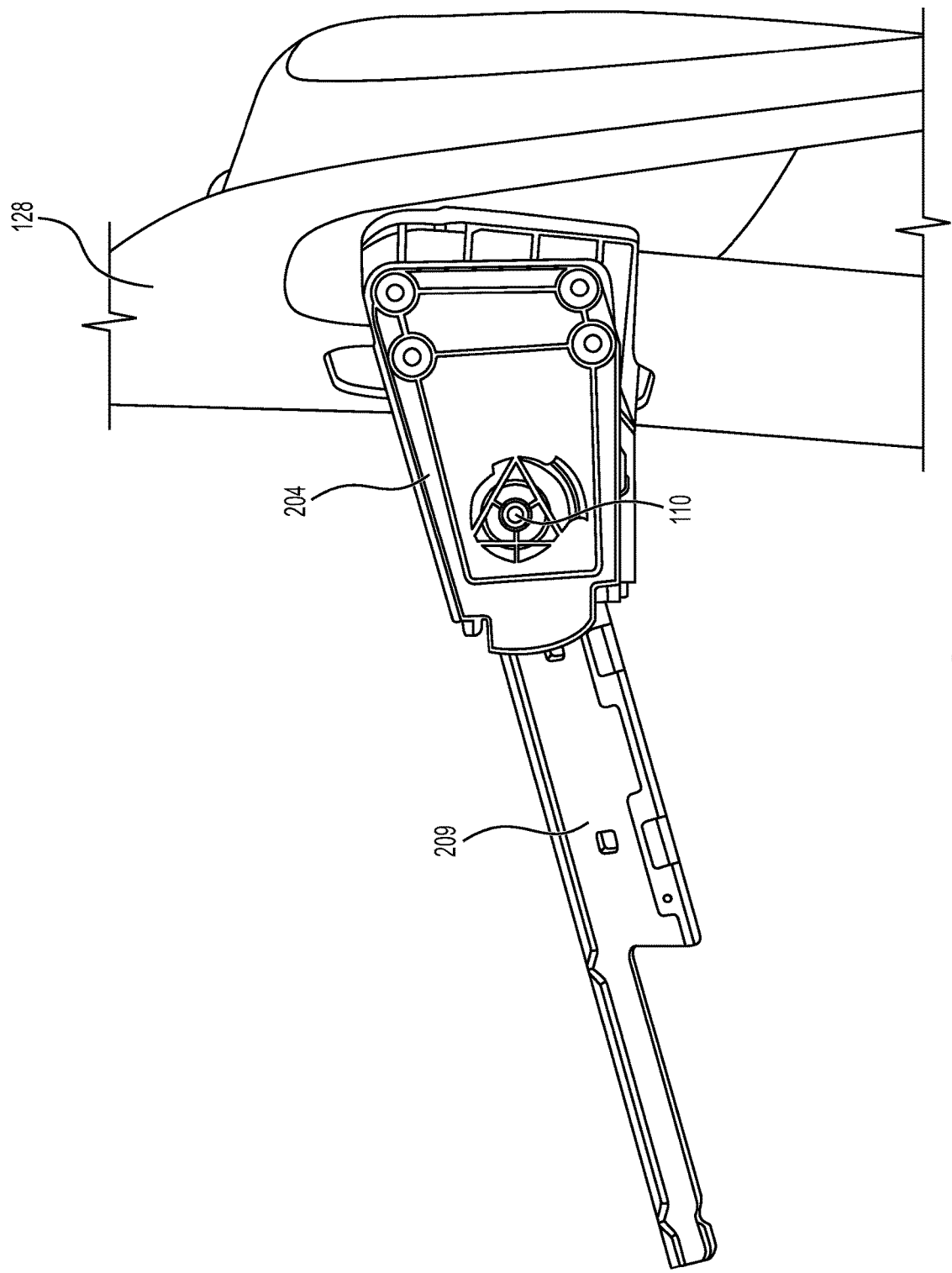

FIGS. 19-21 show additional views of the example first and second telescoping arm assemblies, in accordance with some embodiments. As it would be known to a person of ordinary skill in the art, the mirror assembly is beneficial when the driver is towing a trailer (e.g., a camper). For example, the mirror head can be extended further in an outboard direction relative to the vehicle door 230 to gain a better field of view behind the trailer. The upper bracket key 132 and the base frame key 134 mate with the upper bracket 204 and the lower arm 211 of the base frame 300, respectively. The keys keep the central shaft 110 in a relatively fixed position during normal operation which in turn fixes the first and second telescoping arm assemblies 208, 209 to extend and retract the mirror head 102. The central shaft 110 is a rigid structure which reduces vibration allowing for enhanced viewing.

As shown in FIGS. 19-21, the central shaft 110 is utilized to act as a relatively fixed element for the first and second telescoping arm assemblies 208, 209 of the mirror assembly 100 to extend and retract. The extension and retraction is performed by telescopic outer arms (not shown) movably engaged with the power folding arms.

The central shaft 110 allows for the folding in and out of the mirror head relative to the vehicle door. If the mirror head 102 hits an immovable object (e.g., a tree) the mirror head 102 will pivot about the central shaft 110. The central shaft 110 has a plurality of upper power fold arm keys 136 and a plurality of lower power fold arm keys 138 which serve two or more functions. First, they allow the mirror head 102 to pivot about an axis of the central shaft 110. Second, the upper power fold arm key 136 and the lower power fold arm key 138 act as a gear for the mirror head 102 to be folded in and out by one or more mechatronic mechanisms controlled by the driver of the vehicle 106.

Figure 22:
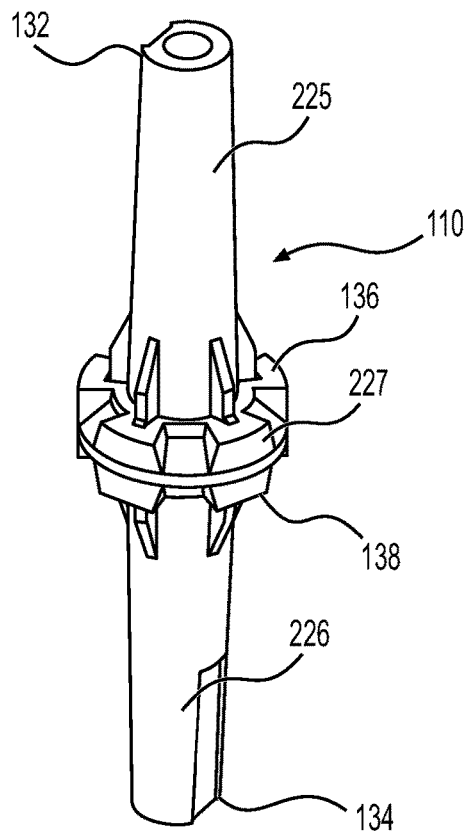
FIGS. 22-24 depict views of an example power fold central shaft which may be used as the central shaft, in accordance with some embodiments.
Figure 23:
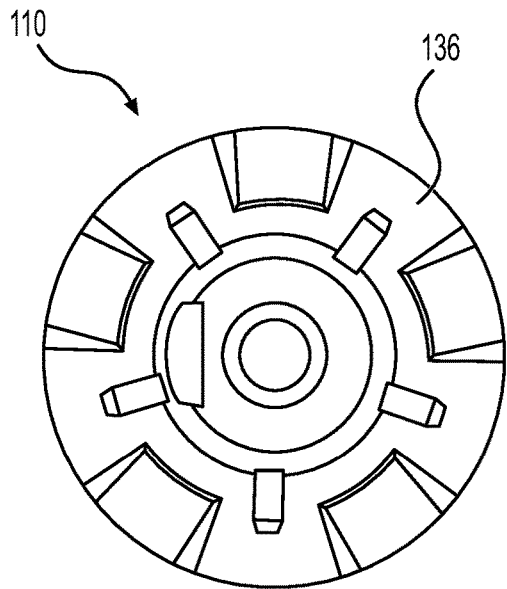
Figure 24:
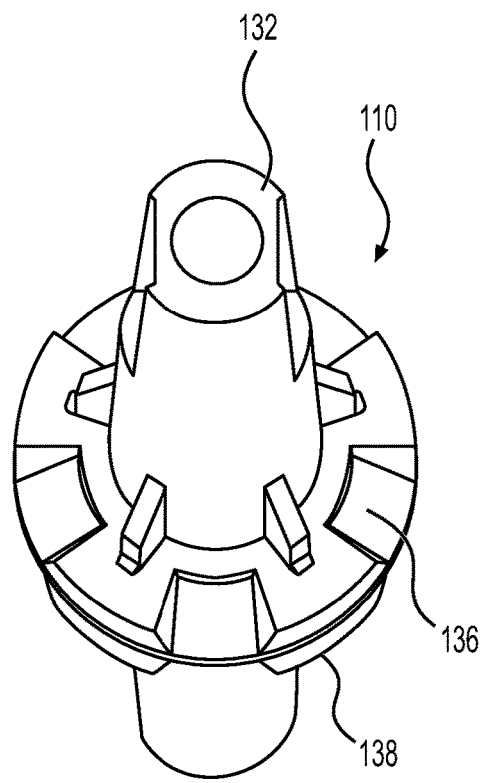

FIGS. 22-24 depict views of an example power fold central shaft which may be used as the central shaft, in accordance with some embodiments. As depicted in FIG. 22, the example power fold central shaft 110 includes an upper portion 225 that includes an upper bracket key 132, and a lower portion 226 that includes a base frame key 134. Furthermore, the central portion 227 of the central shaft 110 includes a plurality of upper powerfold arm keys and a plurality of lower powerfold arm keys 138. The upper bracket 204 may include a protrusion or indent that is configured to engage the upper bracket key 132. By engaging the upper bracket key 132 with its protrusion or indent, the upper bracket 204 may prevent the central shaft 110 from rotating. Furthermore, the lower arm 211 of the base frame 300 may include a protrusion or indent configured to engage the base frame key 134 and assist in preventing the central shaft 110 from rotating.

The plurality of upper powerfold arm keys 136 may be configured to engage with the first telescoping arm assembly 208 as the first telescoping arm assembly 208 rotates about the central shaft 110. For example, the first telescoping arm assembly 208 may engage with a separate upper powerfold arm key 136 each time the first telescoping arm assembly 208 rotates a predetermined angle about the central shaft 110. Furthermore, the plurality of lower powerfold arm keys 138 may be configured to engage with the second telescoping arm assembly 209 as the second telescoping arm assembly 209 rotates about the central shaft 110. For example, the second telescoping arm assembly 209 may engage with a separate lower power fold arm key 138 each time the second telescoping arm assembly 209 rotates a predetermined angle about the central shaft 110.

FIG. 23 shows an upper view of the example power fold central shaft 110, showing an upper view of the upper power fold arm key 136. FIG. 24 shows an angular view of the example power fold central shaft 110 showing the upper bracket key 132, the upper power fold arm key 136, and the lower power fold arm key 138.

Figure 25:
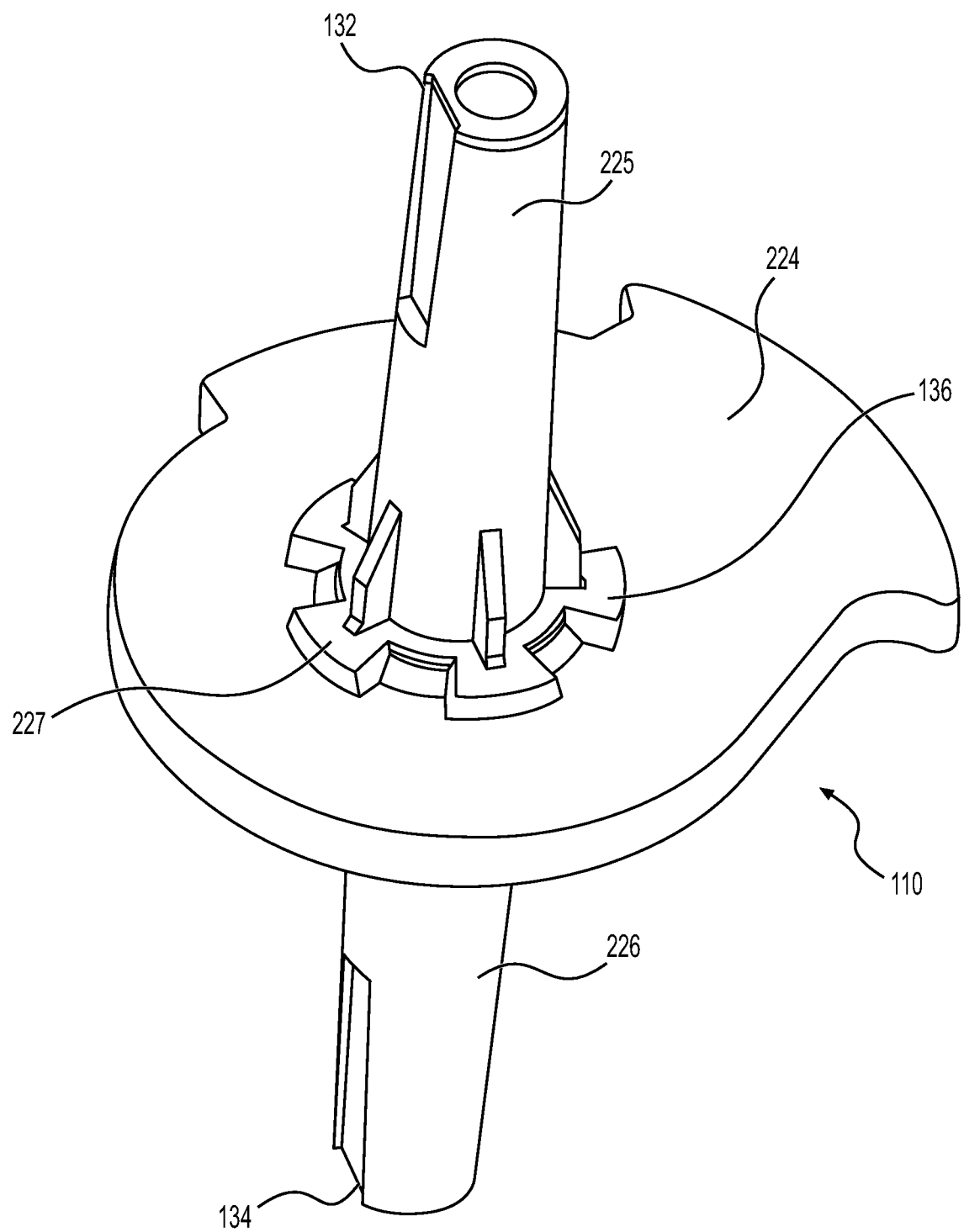
FIG. 25 depicts an alternative example of a power fold central shaft which may, for example, be used for the central shaft of FIG. 14, in accordance with some embodiments.

FIG. 25 depicts an alternative example of a power fold central shaft which may, for example, be used for the central shaft of FIG. 14, in accordance with some embodiments. As shown, the example power fold central shaft 110 may include a central axis powerfold arm 244 coupled to the central portion 227 of the central shaft. The central axis powerfold arm 244 may be configured to be fixedly attached to the central shaft 110. For example, the central powerfold arm 244 may be configured to engage with the plurality of upper powerfold arm keys 136 and the plurality of lower powerfold arm keys 138. The first telescoping arm assembly 208 and the second telescoping arm assembly 209 may engage with and rotate about the central axis powerfold arm 244. Thus, first and second telescoping arm assemblies 208, 209 may be able to rotate continuously about the central shaft 110, rather than in discrete increments.

Figure 26:
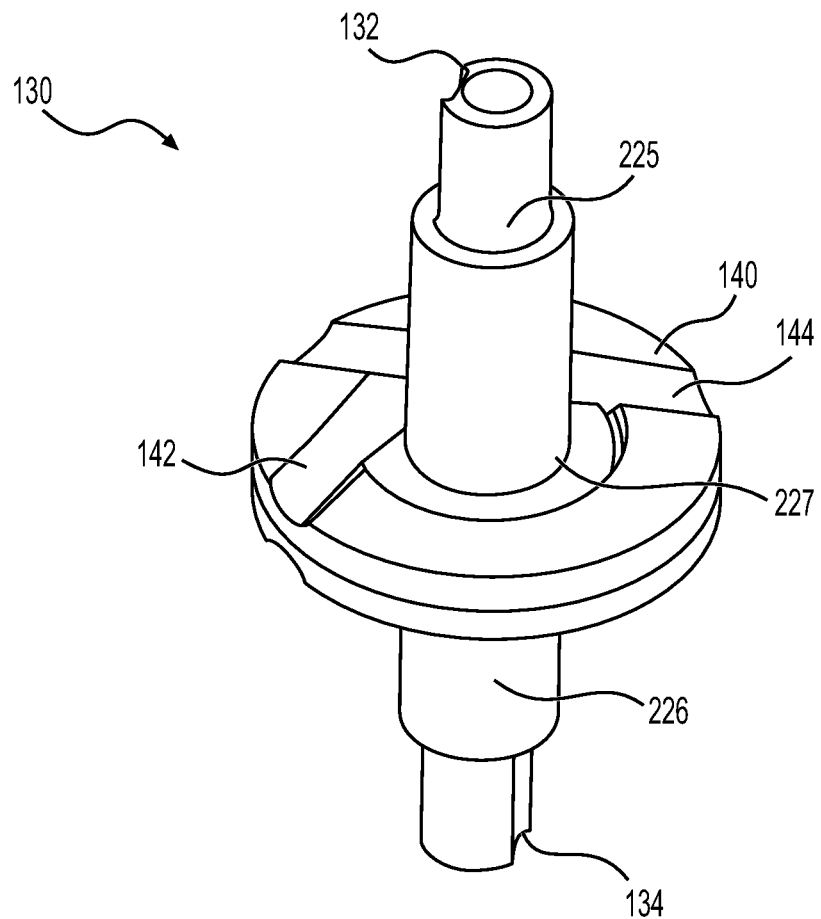
FIGS. 26-27 depict views of an example manual fold central shaft which may, for example, be used for the central shaft, in accordance with some embodiments.
Figure 27:
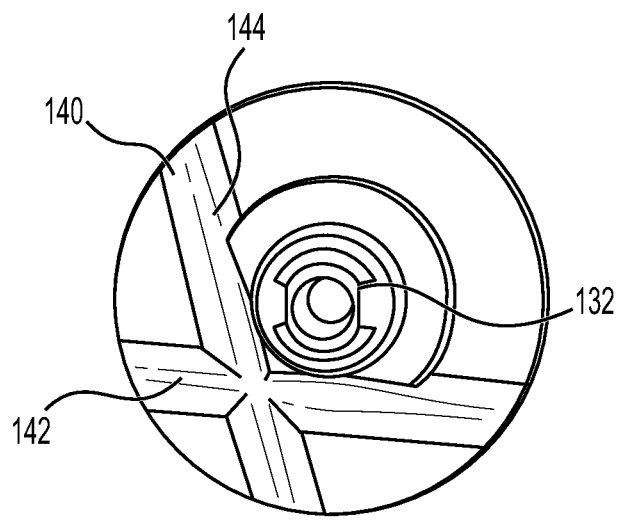

FIGS. 26-27 depict views of an example manual fold central shaft which may, for example, be used for the central shaft, in accordance with some embodiments. FIG. 27 depicts an upper view of the example manual fold central shaft 130, in accordance with some embodiments. As shown in FIG. 26, the example manual fold central shaft 130 includes an upper portion 225, a lower portion 226 and a central portion 227. The upper portion 225 may include an upper bracket key 132. As discussed above, the upper bracket key 132 may engage with the upper bracket 204 to prevent rotation of the central shaft. Furthermore, the lower portion 226 may include a base frame key 134 configured to engage with the lower arm 211 of the base frame 300 to prevent movement of the central shaft. As shown in FIGS. 26 and 27, the manual fold central shaft 130 may include a detent manual fold arm 140 coupled to the central portion 227 of the central shaft. The detent manual fold arm 140 may be circular. The detent manual fold arm 140 may include a first detent 142 extending along a first chord of the detent manual fold arm. The detent manual fold arm may further include a second detent 144 extending along a second chord of the detent manual fold arm 140.

As shown in FIGS. 26 and 27, the first detent 142 and second detent 144 may each include an upper portion on a top surface of the detent manual fold arm 140 and a lower portion on a bottom surface of the detent manual fold arm 140. The upper portions and lower portions of both the first detent 142 and second detent 144 may include radial indents in the top surface and bottom surface of the detent manual fold arm 140. The first end of the first telescoping arm assembly 208 may be coupled to the top surface of the detent manual fold arm 140, and the first end of the second telescoping arm assembly 209 may be coupled to the bottom surface of the detent manual fold arm 140.

The first detent 142 may be utilized to secure the first telescoping arm assembly 208 and the second telescoping arm assembly 209 in a first position. For example, the first and second telescoping arm assemblies 208, 209 may rest within the upper portion of the first detent 142 and the lower portion of the first detent 142, respectively, when the first and second telescoping arm assemblies 208, 209 are in the first position. The first position, for example, may be a position in which the first and second telescoping arm assemblies 208, 209 and the attached mirror head 102 are positioned close to the vehicle door 230 such that the vehicle 106 can occupy less lateral area when parked.

The second detent 144 may be utilized to secure the first telescoping arm assembly 208 and the second telescoping arm assembly 209 in a second position. For example, the first and second telescoping arm assemblies 208, 209 may rest within the upper portion of the second detent 144 and the lower portion of the second detent 144, respectively, when the first and second telescoping arm assemblies 208, 209 are in the second position. The second position, for example, may be a position in which the first and second telescoping arm assemblies 208, 209 and the attached mirror head 102 are protruding laterally from the vehicle 106 and provide a sufficient field of view for the driver that is compliant with applicable regulatory and legal requirements. The driver of the vehicle 106 may transition the first and second telescoping arm assemblies 208, 209 from the first position to the second position by applying a first manual force to the pivotable telescoping mirror assembly 100. Furthermore, the driver of the vehicle 106 may transition the first and second telescoping arm assemblies 208 from the second position to the first position by applying a second manual force to the pivotable telescoping mirror assembly 100. The second manual force may be in an opposite direction compared with the first manual force.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

Furthermore, the features of the disclosure disclosed in this specification, the claims and the drawings may be employed both individually and in any possible combination for 5 practicing the disclosure in its various exemplary embodiments. In particular, all claim feature combinations, irrespective of the claim dependencies, are covered with this application.

REFERENCE LIST

100—Pivotable Telescoping Minor Assembly
102—Minor Head
104—Second Cover
106—Vehicle
108—Base Cover
110—Central Shaft
116—Sheet Metal Pedestal Opening
118—Sheet Metal Patch Area
122—Sheet Metal Inner Reinforcement
126—Power Fold Mechanics
102—Minor Head
132—Upper Bracket Key
134—Base Frame Key
140—Manual Fold Arm
142—First Detent
144—Second Detent
200—Mounting Frame
202—Telescoping Motor
204—Upper Bracket
208—First Telescoping Arm Assembly
209—Second Telescoping Arm Assembly
210—Upper Arm of Base Frame 300
211—Lower Arm of Base Frame 300
212—First Powerfold Motor
213—Second Powerfold Motor
214—Support Element
220—First Pin
222—Second Pin
224—Locking element
225—Upper Portion of Central Shaft 110
226—Lower Portion of Central Shaft 110
227—Central Portion of Central Shaft 110
228—Step Sheet Metal Patch
230—Vehicle Door
232—Rotation Recess
234—Base Frame Support Protrusion
244—Central Axis Powerfold Arm
300—Base Frame
302—Arm Bracket
304—First end of arm assembly 208
306—First end of arm assembly 209
308—Second end of arm assembly 208
310—Second end of arm assembly 209
312—Fastener
400—First Reflective Element
402—Second Reflective Element
500—Second Illumination Module
502—Camera
504—Case Rear
506—First Illumination Module
600—Arm
601, 602—Arm Ends
603, 604, 605, 628—Pins, Screws, Washers, and Brackets
606, 608, 610, 612, 614, 616, 618, 620, 622, 624, 626—Motor and Actuator Components
700—Telescoping Frame Assembly
702, 704—Motor and Motor Rod
706, 707, 718—Motor Gears
708, 710, 712, 714, 715, 720—Pins, Screws, and Washers
722—Cover Plate
800—Mirror Head Assembly
802—Scalp
804—Second Cover
808—Base Cover
900—Mounting Frame
904—Upper Mounting Bracket
905—Lower Mounting Bracket
906—Pivot mounting Frame
908—Upper Telescoping Arm Assembly
909—Lower Telescoping Arm Assembly
912—Lower Powerfold Motor
913—Upper Powerfold Motor
914—Main Mirror
916—Spotter Mirror

What is claimed is:

1. A power telescoping mirror pivot assembly, comprising:
a base frame including a lower arm;
an upper bracket mounted to the base frame;
a central shaft extending between the lower arm and the upper bracket, the central shaft including an upper portion and a lower portion;
a first telescoping arm assembly including a first end and a second end, the first end of the first telescoping arm assembly coupled to the upper portion of the central shaft;
a second telescoping arm assembly including a first end and a second end, the first end of the second telescoping arm assembly coupled to the lower portion of the central shaft;
a first powerfold motor coupled to the first telescoping arm assembly, the first powerfold motor configured to rotate the first telescoping arm assembly about the central shaft;
a second powerfold motor coupled to the second telescoping arm assembly, the second powerfold motor configured to rotate the second telescoping arm assembly about the central shaft;
a mirror head coupled to the second end of the first telescoping arm assembly and the second end of the second telescoping arm assembly; and
a locking element positioned between the first powerfold motor and the second powerfold motor, the locking element configured to provide a space of a predetermined magnitude between the first powerfold motor and the second powerfold motor and to connect the first and second powerfold motors to the central shaft.

2. A power telescoping mirror pivot assembly, comprising:
a base frame including a lower arm;
an upper bracket mounted to the base frame;
a central shaft extending between the lower arm and the upper bracket, the central shaft including an upper portion and a lower portion;

a first telescoping arm assembly including a first end and a second end, the first end of the first telescoping arm assembly coupled to the upper portion of the central shaft;

a second telescoping arm assembly including a first end and a second end, the first end of the second telescoping arm assembly coupled to the lower portion of the central shaft;

a first powerfold motor coupled to the first telescoping arm assembly, the first powerfold motor configured to rotate the first telescoping arm assembly about the central shaft;

a second powerfold motor coupled to the second telescoping arm assembly, the second powerfold motor configured to rotate the second telescoping arm assembly about the central shaft;

a mirror head coupled to the second end of the first telescoping arm assembly and the second end of the second telescoping arm assembly; and at least one pin connecting the first powerfold motor and the second powerfold motor.

3. The power telescoping mirror pivot assembly of claim 1, further comprising a slidable cover assembly attached at a pivot mounting frame, the slidable cover assembly comprising:

a base cover attached to the base fame; and a slidable cover attached to the mirror head, the slidable cover assembly configured to slide laterally with respect to the base cover.

4. The power telescoping mirror pivot assembly of claim 1, further comprising a light module attached to the mirror head.

5. The power telescoping mirror pivot assembly of claim 1, further comprising a camera module attached to the mirror head.

6. The power telescoping mirror pivot assembly of claim 1, wherein the first powerfold motor and the second powerfold motor are configured to rotate the first telescoping arm assembly and the second telescoping arm assembly simultaneously with respect to the base frame.

7. A telescoping mirror pivot assembly, comprising:

a telescoping frame assembly including a first end and a second end;

a central shaft coupled to the first end of the telescoping frame assembly, the central shaft including a detent manual fold arm, the detent manual fold arm comprising:

a first detent configured to mechanically secure the telescoping frame assembly in a first position; and a second detent configured to mechanically secure the telescoping frame assembly in a second position; and a mirror head coupled to the second end of the telescoping frame assembly;

wherein the telescoping frame assembly is configured to transition from the first position to the second position when a first force is applied in a first direction to the mirror head.

8. The telescoping mirror pivot assembly of claim 7, wherein the telescoping frame assembly is further configured to transition from the second position to the first position when a second force is applied to the mirror head in a second direction, the second force being opposite to the first direction.

9. The telescoping mirror pivot assembly of claim 8, wherein the telescoping frame assembly is configured to transition from the first position to the second position and from the second position to the first position by rotating about the central shaft.

10. The telescoping mirror pivot assembly of claim 7, wherein the telescoping frame assembly comprises a first telescoping arm assembly and a second telescoping arm assembly.

11. The telescoping mirror pivot assembly of claim 10, wherein the first detent comprises a top portion and a bottom portion, wherein the first telescoping arm assembly is coupled to the top portion of the first detent and the second telescoping arm assembly is coupled to the bottom portion of the first detent when the first detent is mechanically securing the telescoping frame assembly in the first position.

12. The telescoping mirror pivot assembly of claim 10, wherein the second detent comprises a top portion and a bottom portion, wherein the first telescoping arm assembly is coupled to the top portion of the second detent and the second telescoping arm assembly is coupled to the bottom portion of the second detent when the second detent is mechanically securing the telescoping frame assembly in the second position.

13. The telescoping mirror pivot assembly of claim 10, wherein the central shaft further comprises an upper portion coupled to the first telescoping arm assembly and a lower portion coupled to the second telescoping arm assembly.

14. The telescoping mirror pivot assembly of claim 13, further comprising:

a base frame including a lower arm, the lower arm coupled to the lower portion of the central shaft; and an upper bracket coupled to the upper portion of the central shaft.

15. The telescoping mirror pivot assembly of claim 14, wherein the upper portion of the central shaft comprises an upper bracket key, wherein the upper bracket is configured to engage the upper bracket key and prevent the central shaft from rotating.

16. The telescoping mirror pivot assembly of claim 14, wherein the lower portion of the central shaft comprises a base frame key, wherein the lower arm of the base frame is configured to engage the base frame key and prevent the central shaft from rotating.

17. A method of operating a mirror head assembly comprising:

securing a first end of a telescoping frame assembly at a first position with a first detent on a detent manual fold arm of a central shaft, a second end of the telescoping frame assembly being coupled to a mirror head;

providing a manual force on the telescoping arm assembly;

based on the manual force, removing the first end of the telescoping frame assembly from the first position and rotating the telescoping frame assembly about the central shaft; and based on the rotation of the telescoping frame assembly, securing the telescoping frame assembly at a second position with a second detent on the detent manual fold arm.

18. The method of claim 17, wherein the mirror head assembly is coupled to a vehicle door, wherein the manual force causes the telescoping frame assembly to move laterally inward with respect to the vehicle door.

19. The method of claim 17, wherein the telescoping frame assembly includes a first telescoping arm assembly and a second telescoping arm assembly, wherein the first detent includes a top portion and a bottom portion, wherein securing the first end of the telescoping frame assembly at the first position comprises securing the first telescoping arm assembly to the top portion of the first detent and securing the second telescoping arm assembly to the bottom portion of the first detent.

\* \* \* \* \*